(12) United States Patent
Weald et al.

(10) Patent No.: US 10,817,663 B2
(45) Date of Patent: *Oct. 27, 2020

(54) DYNAMIC NATIVE CONTENT INSERTION

(71) Applicant: Sharethrough Inc., San Francisco, CA (US)

(72) Inventors: Ryan Weald, San Francisco, CA (US); Michael Jensen, San Francisco, CA (US)

(73) Assignee: Sharethrough Inc., San Francisco, CA (US)

( * ) Notice: Subject to any disclaimer, the term of this patent is extended or adjusted under 35 U.S.C. 154(b) by 1001 days.

This patent is subject to a terminal disclaimer.

(21) Appl. No.: 15/173,552

(22) Filed: Jun. 3, 2016

(65) Prior Publication Data

US 2016/0283460 A1 Sep. 29, 2016

Related U.S. Application Data

(63) Continuation-in-part of application No. PCT/US2014/056399, filed on Sep. 18, 2014, which
(Continued)

(51) Int. Cl.
*G06F 40/186* (2020.01)
*G06Q 30/02* (2012.01)
(Continued)

(52) U.S. Cl.
CPC ............ *G06F 40/186* (2020.01); *G06F 40/14* (2020.01); *G06Q 30/0277* (2013.01); *H04L 67/42* (2013.01)

(58) Field of Classification Search
CPC ....................................... G06Q 30/0207–0277
See application file for complete search history.

(56) References Cited

U.S. PATENT DOCUMENTS

| | | | |
|---|---|---|---|
| 6,698,020 B1 | 2/2004 | Zigmond et al. | |
| 6,763,379 B1 | 7/2004 | Shuster | |

(Continued)

FOREIGN PATENT DOCUMENTS

| | | | |
|---|---|---|---|
| WO | WO 01/63444 | 8/2001 | |
| WO | WO-0163444 A2 * | 8/2001 | ............. G06Q 30/02 |

OTHER PUBLICATIONS

U.S. Appl. No. 14/095,163, Final Office Action dated Nov. 4, 2016.
(Continued)

*Primary Examiner* — Chinyere Mpamugo
(74) *Attorney, Agent, or Firm* — Wong & Rees LLP; Karl T. Rees

(57) ABSTRACT

Approaches, techniques, and mechanisms are disclosed for automatically inserting supplemental items into documents. According to an embodiment, a first request is received, comprising document information that identifies a particular document. A target repeated structure type, to which a group of items in the particular document conform, is identified within the particular document. Based on the target repeated structure type, a template is generated. A new content item is generated by applying descriptive metadata that describes the new content item to the template. The new content item conforms to the target repeated structure type. The new content item is inserted in the particular document at an insertion point before or after a particular content item that conforms to the target repeated structure type.

23 Claims, 14 Drawing Sheets

Related U.S. Application Data is a continuation of application No. 14/095,163, filed on Dec. 3, 2013, now Pat. No. 10,380,239, application No. 15/173,552, which is a continuation-in-part of application No. 14/144,079, filed on Dec. 30, 2013, now Pat. No. 9,912,767.

(51) Int. Cl.
*G06F 40/14* (2020.01)
*H04L 29/06* (2006.01)

(56) References Cited

U.S. PATENT DOCUMENTS

| | | | |
|---|---|---|---|
| 7,099,837 | B1 | 8/2006 | Weibel et al. |
| 7,685,191 | B1 | 3/2010 | Zwicky et al. |
| 8,060,604 | B1 | 11/2011 | Breau et al. |
| 8,266,202 | B1 | 9/2012 | Colton et al. |
| 9,912,767 | B1 | 3/2018 | Weald et al. |
| 2002/0116240 | A1 | 8/2002 | Hsuan |
| 2002/0165955 | A1 | 11/2002 | Johnson et al. |
| 2004/0015783 | A1 | 1/2004 | Lennon et al. |
| 2004/0117739 | A1 | 6/2004 | Challenger et al. |
| 2005/0188323 | A1* | 8/2005 | Shibata ............... G06F 40/186 715/760 |
| 2006/0019618 | A1 | 1/2006 | Seppala |
| 2007/0206221 | A1 | 9/2007 | Wyler et al. |
| 2007/0299870 | A1 | 12/2007 | Finch |
| 2008/0018935 | A1* | 1/2008 | Gauthier ............... G06F 40/103 358/1.18 |
| 2009/0024719 | A1 | 1/2009 | Wyler et al. |
| 2009/0228802 | A1 | 9/2009 | Shan et al. |
| 2011/0029393 | A1 | 2/2011 | Apprendi et al. |
| 2011/0107241 | A1 | 5/2011 | Moore |
| 2011/0125587 | A1 | 5/2011 | Netzer et al. |
| 2011/0161362 | A1 | 6/2011 | Lipscombe et al. |
| 2011/0231240 | A1 | 9/2011 | Schoen et al. |
| 2012/0166520 | A1 | 6/2012 | Lindsay et al. |
| 2013/0073399 | A1 | 3/2013 | Celener Nijamkin |
| 2013/0073401 | A1 | 3/2013 | Cook |
| 2013/0179794 | A1 | 7/2013 | Eastham et al. |
| 2013/0238449 | A1 | 9/2013 | Ferreira et al. |
| 2014/0100944 | A1 | 4/2014 | Zhu et al. |
| 2014/0136693 | A1 | 5/2014 | Greifeneder et al. |
| 2015/0154660 | A1 | 6/2015 | Weald et al. |
| 2016/0019243 | A1* | 1/2016 | Kamel ............... G06Q 30/0241 707/737 |
| 2019/0361973 | A1 | 11/2019 | Weald et al. |

OTHER PUBLICATIONS

"Page-Level Template Detection via Isotonic Smoothing", 16th International World Wide Web Conference, WWW2007—Banff, Alberta, Canada.
European Patent Office, Application No. 14868212.3, Extended European Search Report dated Oct. 27, 2016.
European Patent Office, Application No. 14868212.3, Pending Claims as of Oct. 27, 2016.
U.S. Appl. No. 14/095,163, Final Office Action dated Aug. 1, 2017.
U.S. Appl. No. 14/144,079, Notice of Allowance dated Oct. 19, 2017.
U.S. Appl. No. 14/095,163, Non-Final Office Action dated Nov. 2, 2017.
European Patent Office, Application No. 14868212.3, Foreign Office Action dated Aug. 4, 2017.
European Patent Office, Application No. 14868212.3, Pending Claims as of Aug. 4, 2017.
European Patent Office, Application No. 14868212.3, Decision to Refuse dated May 23, 2018.
U.S. Appl. No. 14/095,163, Notice of Allowance dated Mar. 29, 2019.
European Patent Office, Application No. 14868212.3, Summons to Oral Proceedings dated May 23, 2018.
U.S. Appl. No. 14/095,163, Final Office Action dated Jun. 1, 2018.
U.S. Appl. No. 14/095,163, Advisory Action dated Aug. 28, 2018.
U.S. Appl. No. 15/912,424, Notice of Allowance dated Dec. 21, 2018.
U.S. Appl. No. 14/095,163, Non-Final Office Action dated Jan. 29, 2014.
U.S. Appl. No. 14/095,163, Non-Final Office Action dated Aug. 26, 2014.
U.S. Appl. No. 14/095,163, Non-Final Office Action dated Aug. 27, 2014.
U.S. Appl. No. 14/095,163, Final Office Action dated Mar. 24, 2015.
U.S. Appl. No. 14/095,163, Advisory Action dated May 11, 2015.
U.S. Appl. No. 14/144,079, Non-Final Office Action dated Aug. 14, 2015.
U.S. Appl. No. 14/095,163, Non-Final Office Action dated Sep. 11, 2015.
U.S. Appl. No. 14/144,079, Final Office Action dated Jan. 21, 2016.
U.S. Appl. No. 14/095,163, Final Office Action dated Feb. 29, 2016.
U.S. Appl. No. 14/144,079, Advisory Action dated Apr. 19, 2016.
U.S. Appl. No. 14/095,163, Advisory Action dated Jun. 3, 2016.
U.S. Appl. No. 14/144,079, Non-Final Office Action dated Jun. 24, 2016.
World Intellectual Property Organization, Application No. PCT/US14/56399, International Search Report dated Dec. 30, 2014.
World Intellectual Property Organization, Application No. PCT/US14/56399, Pending Claims as of Dec. 30, 2014.

* cited by examiner

DYNAMIC NATIVE CONTENT INSERTION

PRIORITY CLAIM

This application claims benefit under 35 U.S.C. § 120 as a Continuation-in-part of International Application Number PCT/US 14/56399, filed Sep. 18, 2014, which claims priority to U.S. application Ser. No. 14/095,163, filed Dec. 3, 2013. This application claims benefit under 35 U.S.C. § 120 as a Continuation-in-part of U.S. application Ser. No. 14/144,079, filed Dec. 30, 2013. The entire contents of each of the above applications is hereby incorporated by reference as if fully set forth herein. Applicant hereby rescinds any disclaimer of claim scope in the parent application(s) or the prosecution history thereof and advise the USPTO that the claims in this application may be broader than any claim in the parent application(s).

TECHNICAL FIELD

Embodiments relate generally to the insertion of supplemental items into content.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

A supplemental item, as used herein, is a data structure that comprises or causes a presentation of information to be shown in coordination with other media content. The other media content may include, without limitation, web pages, electronic publications, and other types of documents. A user will have typically indicated an express intent to view the other media content, such as by opening a document or clicking on a link. In contrast, the supplemental item is typically not expressly requested by the user.

A particular category of supplemental items described herein is third-party supplemental items. Third-party supplemental items are produced by a third-party entity (the "supplemental item provider") that is different from the producer or publisher of the media content. The publisher of the media content will be requested by the supplemental item provider, or an aggregator that distributes supplemental items on behalf of multiple supplemental item providers, to publish third-party supplemental items along with the publisher's own media content.

Supplemental item placement within media content conventionally involves a number of processes. For example, one of these processes is selecting which supplemental item to place within which items of media content. Various modern computer algorithms automate this selection process to a degree, based on factors such as the actual content of the media item into which a supplemental item is to be placed, current or historical information about an individual to whom the media content is intended to be shown, current or historical information about a client device at which the media content is to be shown, the time of day, and so forth.

Another process involved in supplemental item placement is determining where within the media content to show a supplemental item. This determination is typically a manual process, made by the publisher when designing the layout of content within a certain media. The publisher will often designate certain sections within or around the media content as being sections in which supplemental items may be placed. For greater flexibility in supplemental item placement, these sections are typically of pre-defined sizes. A given supplemental item may then be re-used by a variety of publishers, thus avoiding the need to create new supplemental items for each and every publication in which the supplemental item will be shown.

Some techniques for distributing supplemental items involve content publishers embedding the supplemental items in "iframe" containers. An iframe container, when interpreted by a web browser, causes the web browser to request and display content from a source that is referenced by the iframe container. For example, a third-party distributor of supplemental items may host a web server from which a supplemental item may be retrieved via a source address. A content publisher may "include" this supplemental item in a web page by referencing the source address in an iframe within the web page. Based on cookies and/or session data automatically submitted by the web browser when the web browser requests the contents of the source address from the third-party distributor's web server, the web server may even track distributions of supplemental items to specific users and/or personalize the selection of which supplemental items to return.

Other techniques for distributing supplemental items may not necessarily involve distributing the supplemental items in iframes. Unfortunately, it is often not possible to track and/or personalize content for specific users. This is particularly true for some types of web browsers on mobile devices. This is also particularly true in the case of tracking a user's behavior across different web domains, even if the same third-party entity is distributing supplemental items on the different web domains.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
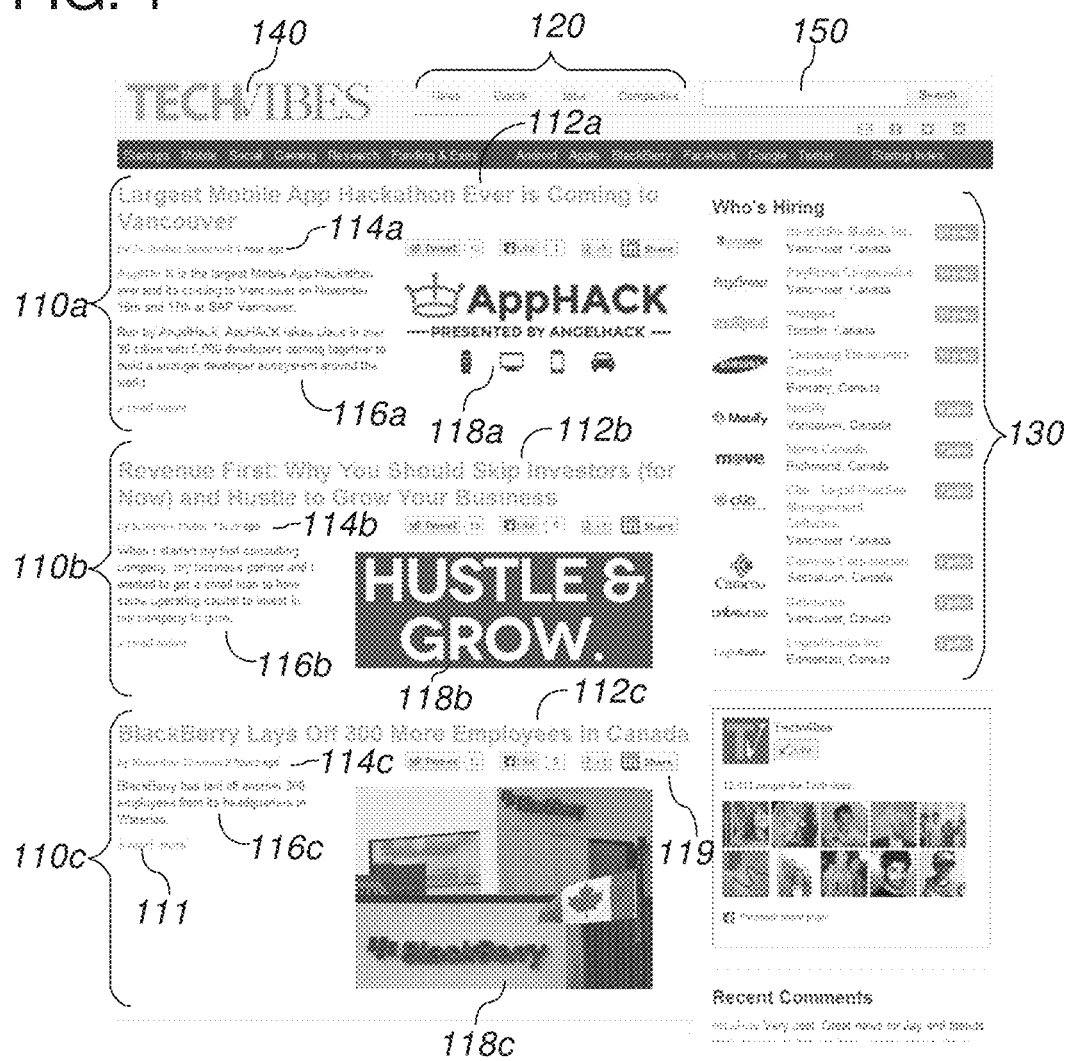
FIG. 1 illustrates an example document into which a supplemental item may be placed.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0. General Overview—Native Content
   1.1. Native Supplemental Content
2.0. Functional Overview—Native Content
   2.1. Insertion of Supplemental Content
   2.2. Repeating Structure types
   2.3. Identifying a Target Repeating Structure Type
   2.4. Generating a Supplemental Item Template
   2.5. Identifying an Insertion Point
   2.6. Achieving Native Appearance
3.0. Structural Overview—Native Content
   3.1. General System
   3.2. System with Client-Based Insertion
   3.3. System with Server-Based Insertion
4.0. Implementation Examples—Native Content
   4.1. Template Verification Data
   4.2. Example Supplemental Item Description
   4.3. Example Rendered Supplemental Item
   4.4. Example JavaScript-Based Insertion Flow
   4.5. Variations
5.0. General Overview—Third Party Tracking
6.0. Structural Overview—Third Party Tracking
   6.1. Client
   6.2. Content Provider Servers/Domains
   6.3. Third Party Tracking/Supplemental Item Server
   6.4. Client-side Components
   6.5. Miscellaneous
7.0. Functional Overview—Third Party Tracking
   7.1. Personalizing Content
   7.2. Event Tracking
   7.3. Extensions
8.0. Implementation Examples—Third Party Tracking
   8.1. Beacon Elements
   8.2. Example JavaScript Implementation
9.0. Implementation Mechanism—Hardware Overview
10.0. Extensions and Alternatives

1.0. GENERAL OVERVIEW—NATIVE CONTENT

Approaches, techniques, and mechanisms are disclosed for automatically inserting supplemental items into documents. According to an embodiment, a first request is received, comprising document information that identifies a particular document. A target repeated structure type, to which a group of content items in the particular document conform, is identified within the particular document. Based on the target repeated structure type, a template is generated. A new content item is generated by applying descriptive metadata that describes the new content item to the template. The new content item conforms to the target repeated structure type. The new content item is inserted in the particular document at an insertion point before or after a particular content item that conforms to the target repeated structure type.

According to an embodiment, a first request is received, comprising content information that identifies particular content. Based on the content information, a template is selected. A new content item is generated by applying descriptive metadata that describes the new content item to the template. The new content item conforms to the target repeated structure type. The new content item is inserted in the particular content at an insertion point before or after a particular content item within a group of content items that conform to the repeated structure type.

In an embodiment, a new content item is selected from a repository of content items submitted by one or more third-party entities. The repository describes each of the content items with metadata values corresponding to defined fields of metadata. The descriptive metadata is retrieved from the repository. The descriptive metadata does not conform to the repeated structure type. In an embodiment, the document/content information in the first request comprises at least one of: a Uniform Resource Identifier (URI) of the particular document/content, or at least a portion of the particular document/content.

In an embodiment, the first request is received at a server, from a client. The server identifies the target repeated structure type and generates the template. The server causes the client to generate the new content item and insert the new content item into the particular document, at least partially by sending the template and the descriptive metadata from the server to the client. In an embodiment, the server further generates insertion instructions that instruct the client to insert the new content item at the insertion point. The server causes the client to generate the new content item and insert the new content item into the particular document at least partially by sending the template, the descriptive metadata, and the insertion instructions from the server to the client.

In an embodiment, the first request is received at a server, from a client. The server identifies the target repeated structure type and generates the template. The server stores the template in a cache. The server receives, from a second client, a second request comprising the document information that identifies the particular document. The server causes generation of the new content item, based on the template in the cache, responsive to the second request. The server further causes the second client to insert the new content item into the particular document. In an embodiment, the server further generates verification data that at least identifies the target repeated structure type. The server stores both the template and the verification data in the cache. The server sends the verification data to the second client. The server instructs the second client to insert the new content item, based on the template in the cache, into the particular document responsive to the second client verifying, based on the verification data, that the particular document still comprises a group of content items that conform to the target repeated structure type.

In an embodiment, the particular document is a web page. The web page includes instructions that cause a client to send the first request to a server. The server responds to the first request at least with supplemental item insertion data configured to cause the client to insert the new supplemental item into the web page.

In an embodiment, a client as described above and in various other passages of the disclosure, is one of a client computing device operated by a user that has requested to view the document, or a website from which the particular document is provided.

In an embodiment, the insertion point is between the particular content item and a second content item that conforms to the target repeated structure type. In an embodiment, a plurality of different repeated structure types are identified within the particular document. Groups of content items within the particular document conform different structure types of the plurality of different repeated structure types. Identifying the target repeated structure type comprises selecting the target repeated structure type from the plurality of different repeated structure types. In an embodiment, based on a plurality of different documents and historical data indicating human feedback concerning the plurality of different documents, a pattern recognition component is trained to recognize repeated structure types, within the plurality of different documents, that have been selected by one or more humans. Identifying the target repeated structure type comprises selecting the target repeated structure type from the plurality of different repeated structure types using the pattern recognition component.

In an embodiment, the target repeated structure type is a construct comprising one or more of: at least one element type, or at least one element attribute.

In an embodiment, generating the template comprises: identifying sub-structure types to which sub-items of content items, in the group of content items, conform; identifying which of the sub-structure types are repeated sub-structure types that are used in multiple content items within the group of content items; mapping the repeated sub-structure types to fields of metadata within a repository of supplemental item metadata; generating one or more template elements that correspond to the target repeated structure type; generating, within the one or more template elements, one or more template sub-elements that correspond to the mapped repeated sub-structure types; and inserting identifiers representing the mapped fields of metadata into template sub-elements to which the mapped fields of metadata are mapped.

In an embodiment, the insertion point is selected based on one or more of: client identification information associated with the first request, user identification information associated with the first request, or one or more keywords identified within the group of content items.

According to an embodiment, a system for practicing techniques described herein comprises: a distribution component, configured to distribute item insertion initiating instructions to clients at which documents will be displayed, the item insertion initiating instructions configured to cause the clients to send requests to a server to insert supplemental items into the documents; a template cache configured to store, in one or more memories, supplemental item templates; a template loader component, at the server, configured to select particular supplemental item templates from the template cache based on document identifying information associated with the requests; a repository of supplemental items configured to store supplemental item descriptive metadata for each of the supplemental items; an item selector component, at the server, that selects, from the repository of supplemental items, particular supplemental items to insert in the documents based on the requests; one or more supplemental item renderers configured to generate rendered supplemental items based on particular supplemental item templates selected by the template loader component and particular supplemental items selected by the item selector component; and one or more item insertion components that insert the rendered supplemental items into the documents.

In an embodiment, the system further comprises a template generation component that generates the supplemental item templates based on repeated structure types identified within the documents.

In other aspects, the invention encompasses a computer apparatus and a computer-readable medium configured to carry out the foregoing steps.

For convenience, this disclosure describes several examples of supplemental items. However, the techniques described herein are equally applicable to the insertion of other types of supplemental items into documents and other content.

1.1. Native Supplemental Content

FIG. 1 illustrates an example document 100 into which a supplemental item may be placed, according to an embodiment. Example document 100 includes, among other components, content items of non-repeating structural types, such as a title 140 and search box 150, and content items of repeating structural types, such as navigation links 120, listings 130 and news feed articles 110. Document 100 is an example of an increasingly prevalent type of document known as a "feed," in which the main content of the document is a set of multiple similar content items that are grouped together in an arrangement, such as a list. Feeds appear in a variety of contexts, such as news aggregation, social media, shopping applications, forums, and so forth.

Content items 110-150 may comprise their own sub-elements of varying structure types. For example, news feed articles 110 each comprise sub-elements that correspond to different sub-structure types, including article title 112, article publishing information 114, article content 116, and article image 118. For instance, if example document 100 were a web page written in Hyper-Text Markup Language ("HTML"), each content item 110a-110c might be of a <div> element type with a "class='article'" attribute (collectively denoted herein as a "div.article" structure type). Similarly, each sub-element 112 might be of an "h3" structure type, each sub-element 114 might be of a "span.author" structure type, each sub-element 116 might be of a "div.content" structure type, and each sub-element 118 might be of an "div.thumbnail" structure type. Of course, these data structure types are given only as an example, and document 100 is not limited to any particular set of underlying data structure types. Each news feed article 110 may further comprise sub-elements such as an article footer 111 and sharing controls 119.

Figure 2:
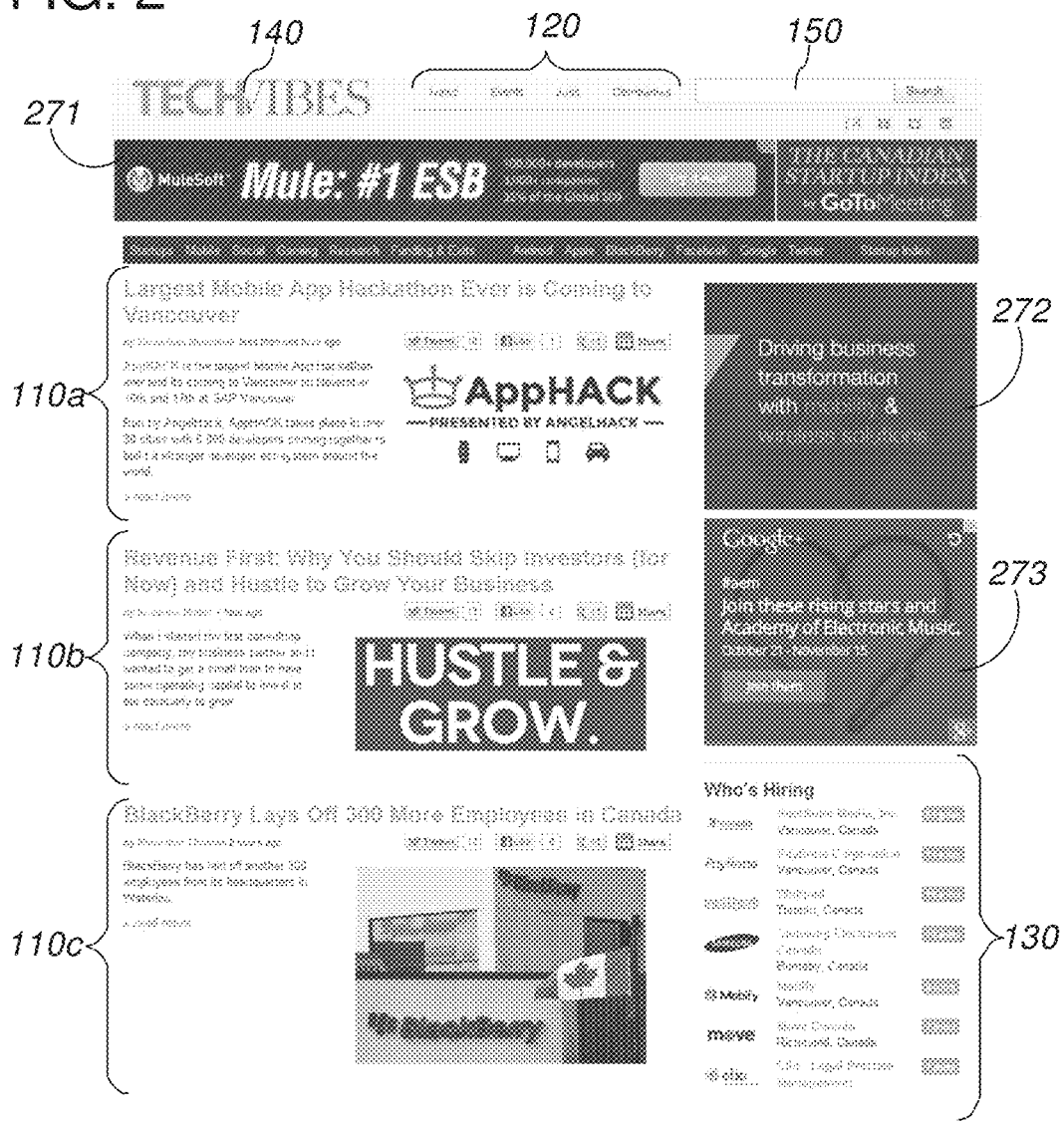
FIG. 2 illustrates an example document in which supplemental items have been placed using conventional techniques.

FIG. 2 illustrates an example document 200 in which supplemental items have been placed using conventional techniques. Example document 200 comprises the same components 110-150 as example document 100 above. Additionally, certain pre-defined sections of document 200 have been reserved for supplemental items, including supplemental items 271-273. Supplemental items 271-273 are images of pre-defined size, and quite easily differentiated from components 110-150.

Figure 3:
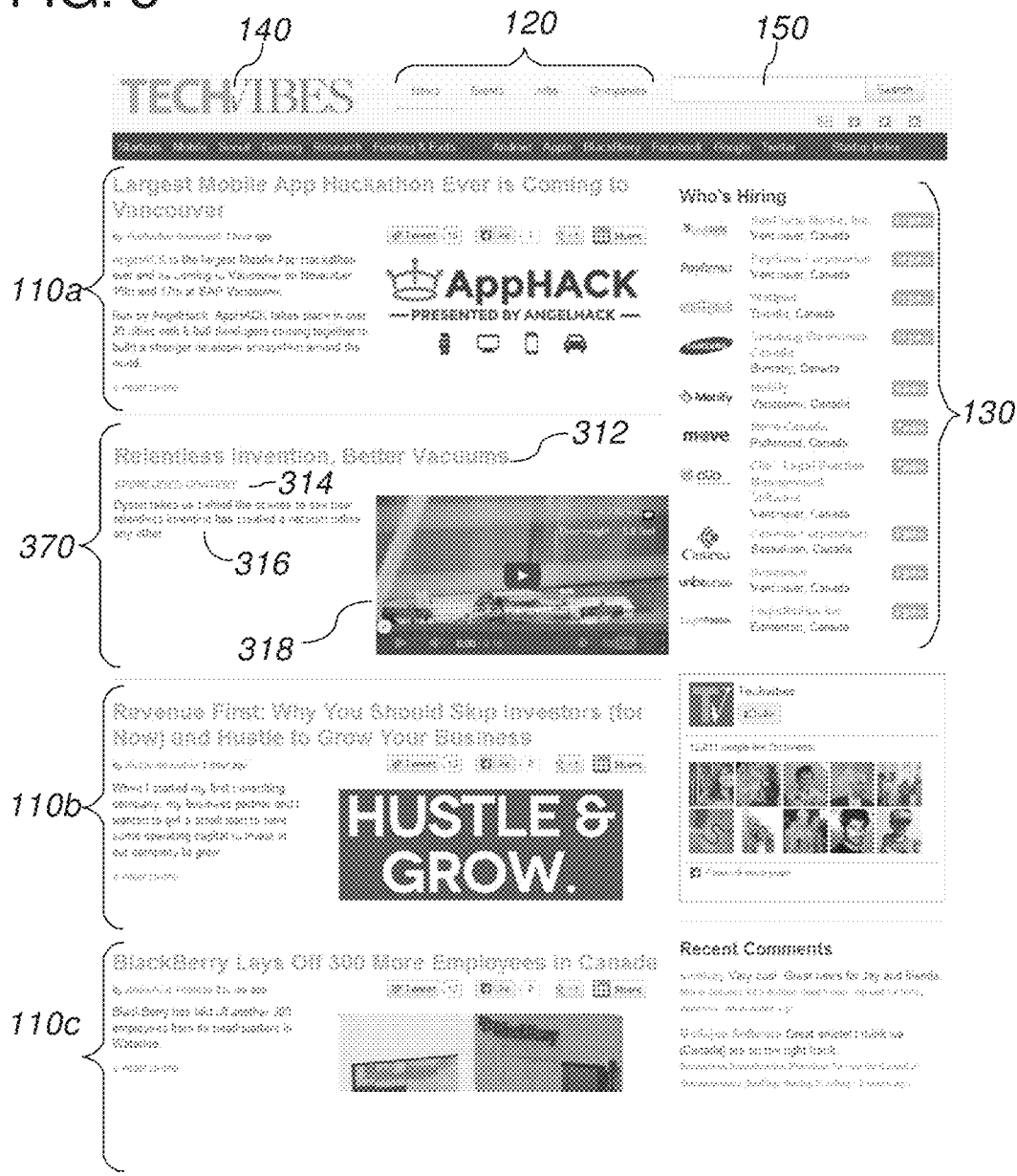
FIG. 3 illustrates an example document in which supplemental items have been placed using a "native" placement technique.

FIG. 3 illustrates an example document 300 in which supplemental items have been placed using a "native"

placement technique, according to an embodiment. Example document 300 comprises the same components 110-150 as example document 100 above. Example document 300 further comprises a supplemental item 370. In contrast to supplemental items 271-273 of FIG. 2, supplemental item 370 has been inserted into a group of content items 110 that have a same structure type. More specifically, supplemental item 370 has been inserted between content items 110a and 110b, to appear as a member of the group of content items 110. Consequently, supplemental item 370 is not so easily differentiated from components 110-150 as supplemental items 271-273 of FIG. 2.

Consistent with this appearance, supplemental item 370 is of a structure type that is analogous to that underlying content items 110. Supplemental item 370 further comprises sub-elements that include title 312, sponsorship information 314, content 316, and image 318, which are of analogous sub-structure types to sub-elements 112, 114, 116, and 118, respectively. For instance, referring back to the HTML-based example above, supplemental item 370 might be of the "div.article" structure type, sub-element 312 might be of the "h3" structure type, sub-element 314 might be of the "span.author" structure type, sub-element 116 might be of the "div.content" structure type, and sub-element 118 might be of the "div.thumbnail" structure type.

However, a strict reuse of structure and/or sub-structure types between content items 110 and supplemental item 370 is not necessary, so long as supplemental item 370 is rendered in such a manner that sub-elements 312-318 are arranged and formatted substantially similarly to sub-elements 112-118. For example, in some embodiments, a supplemental item may keep the same arrangement of structure types, but substitute one or more formatting classes and/or attributes so that the supplemental item has a slightly different appearance. For instance, the supplemental item may have a different background, title font, margin, thumbnail size, or any other formatting difference. As another example, a supplemental item may use one or more different structural elements than found in the content items, but nonetheless apply the same formatting classes and/or attributes to those different structural elements as were applied to the structural elements of the content items.

This disclosure describes a number of techniques and mechanisms whereby supplemental items, such as supplemental item 370, may be inserted into content, such as document 100, "natively," such as illustrated by FIG. 3. Example document 100 illustrates but one of many types of documents for which these techniques and mechanisms may be utilized. In other such documents, content items having a same structural type may be organized in different arrangements, such as galleries, lists, slideshows, etc. Native supplemental items may be inserted into these and any other suitable arrangement of content items that have a same structure type. Moreover, while document 100 is a web page, the techniques described herein may be applied to any type of media that comprises a group of content items that have an identifiable common structure type, including feeds shown within standalone applications, such as applications for smartphones or desktop computer.

Moreover, each content item having a repeated structure type need not necessarily be rendered in exactly the same manner. For example, formatting instructions included with a document may dictate that a first set of one or more content items within a group of content items be presented differently than a second set of one or more content items within the same group, even though all content items within the group share the same structure type. This may occur on a website, for instance, where the top several news article are displayed using expanded formatting, whereas the remainder are shown as a gallery or list. In an embodiment, a supplemental item could be inserted into the group and presented using either formatting style, depending on where the supplemental item is inserted.

A document as used herein refers to content provided from a particular location, such as a URL. The content provided from the particular location may, of course, change from time to time, or even from one access request to another access request. However, for purposes of this disclosure, the content provided from the particular location is still considered to be the same document, even after changing.

2.0. FUNCTIONAL OVERVIEW—NATIVE CONTENT

In an embodiment, each of the processes described in this section may be implemented using one or more computer programs, other software elements, and/or digital logic in any combination of general-purpose computing devices or a special-purpose computing devices, while performing data retrieval, transformation, and storage operations that involve interacting with and transforming the physical state of memory of the computing devices(s). In some embodiments, the processes are implemented in a system comprising a client computing device at which the document is viewed, such as a personal computer or mobile device, and one or more servers, such as a web server and/or a third-party supplemental item insertion server. A server, as used herein, is a system of one or more computing devices that collectively operate to provide various functionalities described herein. In other embodiments, the processes are implemented exclusively by one or more servers or by a single client computing device. Specific examples of such systems are described in subsequent sections.

2.1. Insertion of Supplemental Content

Figure 4:
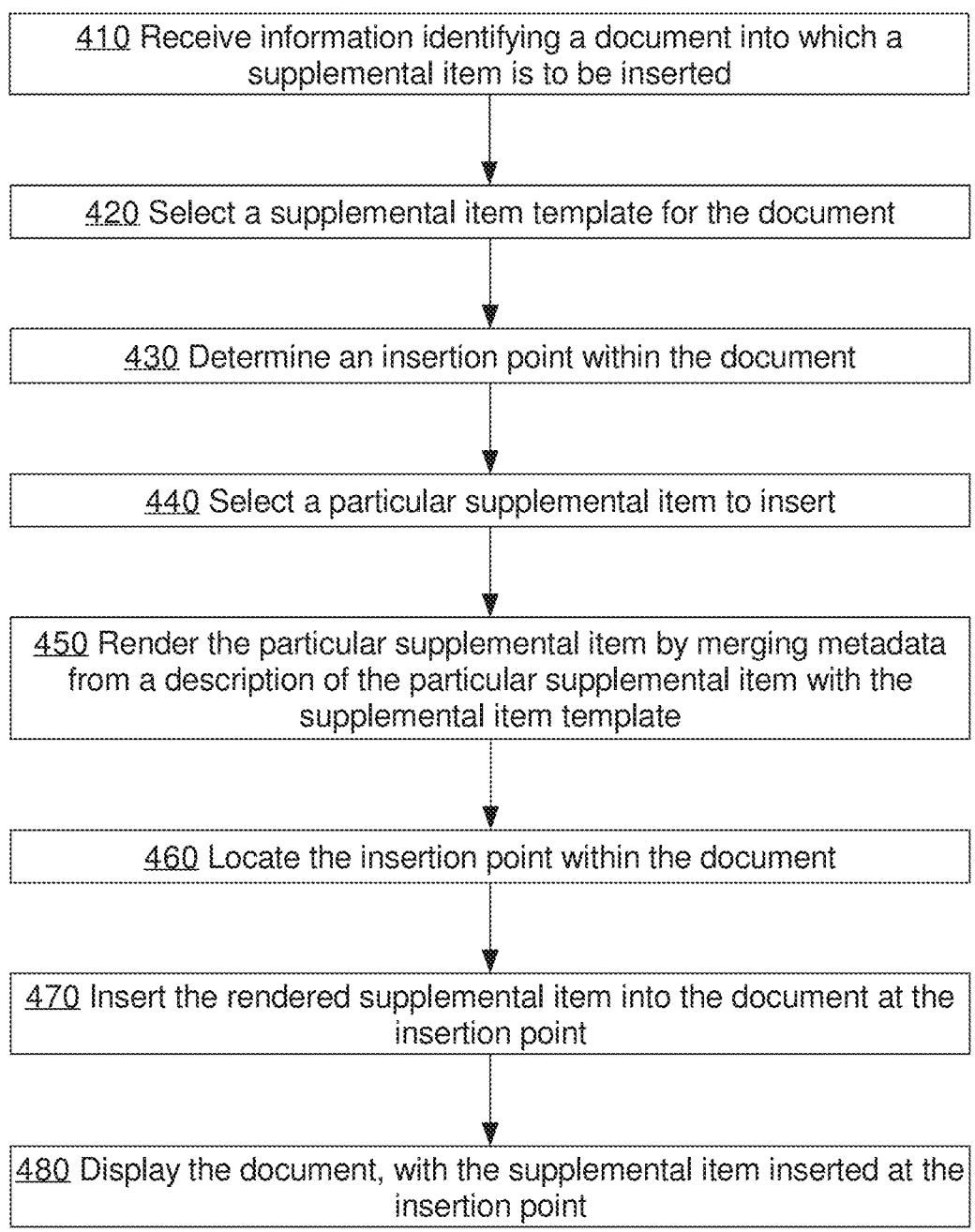
FIG. 4 depicts an example flow for inserting a supplemental item within a document.

FIG. 4 depicts an example flow 400 for inserting a supplemental item within a document, according to an embodiment. Block 410 comprises receiving information identifying a document into which a supplemental item is to be inserted. The information may be received, for example, in a request over a network and/or via a call to an application programming interface. The information may include the document itself and/or refer to the document by one or more identifiers, such as a Uniform Resource Locator ("URL").

Block 420 comprises selecting a supplemental item template for the document. In an embodiment, templates are selected from a plurality of pre-existing templates based on the document or the document identifier. The template may have been specifically associated with one or more URLs or other suitable document identifiers, including that of the document. Or, the template may be selected based on comparing repeated data structures within the document to the pre-built templates, and selecting the closest match. In an embodiment, client characteristics and/or user data may also be considered when selecting a template. For example, different templates may be selected depending on information in the browser user agent string received from the client that will be displaying the document.

In an embodiment, selecting the supplemental item template may involve generating a new template for the document. Template generation may involve retrieving the document (if it was not received in block 410) and analyzing the document for repeating data structure types, as described in other sections.

In an embodiment, selecting the supplemental item template may involve determining whether a pre-existing supplemental item template is found for the document in a template cache. If so, then the pre-existing supplemental item template is selected. Otherwise, a new supplemental item template is generated and selected. The new supplemental item template may be cached for future use. In an embodiment, since template generation may be a relatively time-consuming process, if a valid pre-existing supplemental item template is not found, a default template is selected until a new supplemental item template can be generated. Meanwhile, a new supplemental item template is generated in the background, or scheduled for generation, and then cached for future instantiations of flow 400. In an embodiment, if a valid pre-existing supplemental item template is not found, the current instantiation of flow 400 is aborted, and no supplemental item will be inserted into the document for this current instantiation.

In an embodiment, the document is identified by a URL. The document may change from time-to-time. An external process, outside of flow 400, may periodically or semi-periodically request the document from the URL, and generate a new supplemental item template for the document. The new supplemental item template may then be cached for future use. In an embodiment, this process and/or block 420 in general may further comprise determining whether the document has changed since its supplemental item template was generated. The pre-existing supplemental item template is used only if the document has not changed. In other embodiments, the pre-existing supplemental item template may still be used even if a document has changed, so long as the data structure types found within the document remain the same. Example techniques for making such determinations are found in other sections of this disclosure.

Block 430 comprises determining an insertion point within the document. The insertion point is often between a first content item in a group of content items that have a common structure type and a second content item in the group. The insertion point may instead be at the beginning or end of the group, but still within a container structure for the group. Performance of block 430 assumes that the group of content items, or at least the underlying data structure type of the content items in the group, has already been identified, either as part of block 420, in another function block (not depicted), or at the time a pre-existing template in the cache was generated. Techniques for identifying such a group, and for identifying an insertion point relative to such a group, are described in other sections.

In some embodiments, on account of template caching, the actual group of content items into which the supplemental item should be inserted is not known at the time of determining the insertion point. Consequently, the insertion point may be designated by the location of a target data structure type within the document, such as by a schema element name, DOM node, or other suitable convention. In an embodiment, the insertion point is further designated relative to an enumerated content item of the group of content items into which it is to be inserted. For instance, the insertion point may be designated as "before the fourth content item having structure x," or "after the ninth content item found in the container structure y."

Block 440 comprises selecting a particular supplemental item to insert. In an embodiment, the selection of the particular supplemental item involves selecting from supplemental items described in a data repository. Each of the supplemental items is described with metadata, some or all of which may be utilized in selecting the particular supplemental item. The descriptive metadata may include, for instance, a title, content, thumbnail, video, image, link address, keyword(s), and so forth. Each supplemental item may further be associated with distribution metadata, such as a number of times the item has been inserted, a click-through rate, a target number of insertions, preferred provider(s) into whose content the supplemental item is to be inserted, and so forth. Considerations involved in selecting the particular supplemental item may include a random number function, an item selection pattern, a comparison of certain descriptive metadata for each supplemental item to current, previous, and/or expected contents of the document, predefined associations between certain supplemental items and the document or a provider of the document, predicted user behavior based on historical tracking data, and so forth. In an embodiment, the selection involves a ranking process based on any one or more of the above considerations.

Block 450 comprises rendering the particular supplemental item by merging metadata from a description of the particular supplemental item with the supplemental item template. The rendering may involve any of a variety of template-based techniques. For example, the rendering may involve inserting descriptive metadata items for the particular supplemental item into template elements to which the descriptive metadata items have been respectively mapped. As another example, the rendering may involve replacing variables within the supplemental item template with descriptive metadata items to which the variables are mapped.

Block 460 comprises locating the insertion point within the document by any of a variety of mechanisms. For example, if the insertion point is designated by a data structure type and number, the insertion point may be located by searching for content items that conform to the target data structure type until the designated number of content items is found. The searching may involve standard string searching, building a document-object-model ("DOM"), and/or other searching techniques. Or, as another example, if the insertion point is designated using a specific address, the location of the specific address within the document may be found. In an embodiment, block 460 may also or instead involve searching for a pre-defined insertion point within the document, such as indicated by publisher comments in markup code or other suitable means. In an embodiment, block 460 may also or instead involve searching for a particular content item that both conforms to the target data structure type and has certain characteristics, such as certain text or keywords.

Block 470 comprises inserting the rendered supplemental item into the document at the insertion point. Any of a variety of insertion techniques may be utilized, depending on the context. For example, if the insertion is being performed on a web page by a web browser at a client device, the insertion may be accomplished using any of a number of JavaScript functions. As another example, if the insertion is being performed by a web server, most programming languages feature a number of string manipulation and/or DOM manipulation functions that allow insertion of the rendered supplemental item at the designated insertion point. In an embodiment, the insertion involves inserting the supplemental item as a new content item before or after an existing content item, without deleting any content items from the document. In another embodiment, block 470 may comprise deleting an existing content item at the identified insertion point, and replacing it with the supplemental item.

Block 480 comprises displaying the document, with the supplemental item inserted at the insertion point. For example, after having inserted a supplemental item such as supplemental item 370 of FIG. 3 into a document such as document 100 of FIG. 1, a web browser would display the document 300 as depicted in FIG. 3.

Flow 400 is but one example technique for inserting a supplemental item. Other flows may include fewer or additional elements in varying arrangements. Blocks 410-480 need not be started or completed in any particular order, except where they rely on data from another of blocks 410-480. For example, in some embodiments, block 420 and block 440 may be performed at substantially the same time relative to each other, or block 440 may be performed prior to block 420.

In some embodiments, multiple supplemental items may be inserted into a single document. In an embodiment, the multiple supplemental items may be inserted over multiple instantiations of flow 400. Block 420 may or may not be repeated for each of these instantiations. In another embodiment, multiple supplemental items and insertion points may be selected in a single instantiation of flow 400. For example, multiple supplemental items and multiple insertion points may be returned along with a common supplemental item template, in response to a single request from a client to insert items into a web page. In yet another embodiment, a document may comprise multiple groups of content items into which supplemental items are to be inserted, the content items in each group having a different common structure type. Therefore, multiple supplemental item templates are identified in addition to the multiple supplemental items.

2.2. Repeating Structure Types

Various processes described herein involve identifying and/or referencing one or more repeated "structure types" for content items, and their respective sub-elements, within a document. In an embodiment, the structure type of a content item is a document-specified construct to which the content item conforms. The document-specified construct may be a construct specifically defined by a schema, document type definition, or other suitable pre-declared definition. For example, in the context of an HTML document, the structure type may a specific element type (i.e. the "tag name"), such as <div> or <p>. The document-specified construct may also be a classifier, such as a HTML class attribute, or other suitable declared attribute of the HTML elements.

In an embodiment, the structure type may be a combination of one or more pre-declared constructs and one or more attributes. For example, in the context of an HTML document, the structure type might be a combination of the <div> element type with a "class='article'" attribute (denoted herein as a "div.article" structure type). As another example, two or more HTML element types may repeat together in a pattern. These two or more HTML element types collectively constitute a repeating structure type.

In an embodiment, some or even all of the structure types are derived constructs. These constructs are derived from a comparison of characteristics from document content items with characteristics from other document content items. For example, a repeating structure type may be derived from the fact that multiple content items within the document include certain formatting styles, a certain thumbnail image or size of image, and/or certain introductory textual content. In fact, a repeating structure type may be derived from just about any common characteristic(s) shared by multiple content items within a document, so long as the characteristic(s) may be described in such a manner so that content items having the characteristic(s) may subsequently be located during the insertion process.

In an embodiment, a single content item within a document may be considered to conform to multiple construct types. For example, consider the following two HTML elements shown in Table 1.

TABLE 1

EXAMPLE HTML ELEMENTS

<div class="a b c">
  Some Text
</div>
<div class="b c d e">
  More Text
</div>

Example repeating structure types between these two content items include: the <div> element type by itself, div.b, div.c, and div.b.c (i.e. a <div> element type with both the "b" classifier and the "c" classifier).

2.3. Identifying a Target Repeating Structure Type

In many documents, there is typically a content section that a publisher will consider to be the "primary" content. This "primary" content section may comprise anything from a single news article or story, to a "feed" or other grouping of multiple content items. There may also be a number of content sections that are secondary in nature, such as navigation menus, sidebars, footnotes, and so forth. In an embodiment, it is desirable to insert supplemental items into a group of content items in the content section that a viewer would consider to be the "primary" section. However, while it may be obvious to the viewer which section is primary, identifying this section can be a relatively difficult task for a computer, particularly when there are multiple different groups of content items that have their own respective common structure type(s). Various rules and/or machine learning algorithms may be utilized to predict the primary section of the document, based on a structure type that is repeated within that section. This structure type is described herein as the "target" repeating structure type, and it may be used both for generating the supplemental item template, and for identifying the insertion point within the document.

In an embodiment, identifying the repeating structure type is a relatively trivial task, either because the insertion process involves documents with only one repeated structure type, or because the target repeating structure type is guaranteed to always have a specific name or identifying characteristic. For example, in an embodiment, each content item in the group of content items into which a supplemental item is to be inserted is required to have a specific element name or class, such as "article," "post," "feeditem," or "entry." In an embodiment, the document publisher may simply provide a name or identifier of the repeating structure type to supplemental item insertion component. For example, the document publisher may provide the name or identifier as a parameter in an application programming interface ("API") call that initiates the insertion process. Or, the document publisher may specify a name or identifier of the target repeating structure type for a set of documents in a separate configuration process.

In an embodiment, identifying the target repeating structure type involves applying a pattern-matching algorithm to identify repeating structures. For example, one technique might involve simply performing string-based searches for repeating markup tags or attributes. Another technique might involve constructing a DOM or other document structural tree and analyzing the various nodes thereof for the types of repeating structure types described in the previous section. In an embodiment, the tree may be analyzed using a bottom-up approach. For instance, a repetition of image nodes at a certain level within the tree, or a repetition of a certain structure such as a parent node consisting of two child nodes, may suggest a pattern. The algorithm may recursively walk up the tree looking for root nodes at which this pattern begins. In an embodiment, the tree may instead be analyzed using a top-down approach.

A pattern recognition algorithm may then be applied to determine which of the identified repeating structure types is most likely the target repeating structure type, based on historical user feedback. For instance, the algorithm may have been trained based on historical data indicating that 95% of the time, when a given structure type repeats ten or more times with the same classifier, the given structure type is the target repeating structure type. Thus, the algorithm selects the given structure type.

In an embodiment, some or all identified repeating structure types identified within the document are analyzed to derive features representative of any of a variety of characteristics. Example characteristics represented by these features include, without limitation, how often a structure type is repeated, how similar the contents of each content item that conforms to the structure type are, the presence or absence of certain keywords (such as "article" or "related content") in or adjacent to content items that conform to the structure type, the types of formatting applied to the repeating structure types in a style sheet or in other formatting instructions, the types of repeated sub-structures found within content items that conform to the structure type, how well those repeated sub-structure types map to the descriptive metadata for a supplemental item, and/or where the content items that conform to the structure type appear in the document. A ranking function may be applied to each repeating structure type found in the document, with the highest-ranked repeating structure type being selected as the target repeating structure type. The weights of the ranking function may be learned from human-supervised classifications of content items in a training set of documents, and/or updated based on feedback from human-based evaluation of the results of the ranking function over time.

In an embodiment, a trained algorithm looks for patterns of repeated element types, element classes, and/or element formatting styles. Once the patterns have been discovered, the algorithm recursively traverses the DOM tree up from the elements that form the pattern, to identify any nodes that may be root nodes for the target repeating structure type. Through statistical pattern detection, the most important patterns and their corresponding root nodes are identified. The algorithm may involve, without limitation, hidden markov models, Bayesian classifiers, neural networks, and/or other suitable pattern recognition approaches.

In an embodiment, for certain "close" cases, in which the confidence of a ranking function or classifier is not above a threshold percentage, the document may be submitted to a human-supervised classification process for review, such as "Mechanical Turk" by Amazon.com, Inc. A human may designate the "most important" content items in the document, and the repeating structure type that most closely corresponds to those content items is used. The feedback may further be used to improve the ranking function or classifier.

In an embodiment, identifying the target repeating structure type involves determining whether the document is associated with a separate Rich Site Summary (RSS) feed, or other type of feed. For example, the document may reference the URL of an RSS feed in its header. The feed items within the feed are compared to the content items within the document. A group of content items that are substantially similar to the feed items is selected. For example, if the title and/or description of each feed item is the same as text found within a first portion of each content item in a group of content items, the group of content items is selected. One or more data structure types to which each item of the group of content items conforms are identified, and the target data structure may then be selected from the identified structure types based on techniques described above. In an embodiment, the RSS feed may only be consulted if the above techniques fail to identify a target repeating structure type with a threshold level of confidence. In an embodiment, the fact that a group of content items matches feed items is but one consideration in rules and/or ranking functions for selecting the target repeating structure type.

In an embodiment, target repeating structure types may be selected for objectives other than identifying the primary repeated content of interest on the page. For example, rules may be designed, or algorithms may be trained, to identify a group of content items most likely to constitute a "related items" section or a "navigation" section. Moreover, for documents in which multiple supplemental items are to be inserted, different repeating structure types may be the target of different supplemental items. For example, one supplemental item may be inserted in a group of content items most likely to constitute a slideshow, whereas another supplemental item may be inserted in the group of content items most likely to constitute a comments feed.

2.4. Generating a Supplemental Item Template

Once the target repeating structure type for a document has been identified, a supplemental item template may be generated based on an analysis of the contents of one or more content items that conform to the target repeating structure type. In an embodiment, this process comprises identifying sub-structure types found in the analyzed content item(s). The identified sub-structure types may be limited to those that are used in at least a substantial number of content items that conform to the target structure type, or the sub-structure types may simply be taken from one or more content items without consideration of how often they repeat.

Various fields of supplemental item descriptive metadata are then mapped to the most appropriate sub-structure type. This mapping may involve comparing contents associated with these sub-structures to supplemental item metadata, processing the contents using pre-defined rules, or any other suitable mapping technique. For example, certain types of sub-elements, such as the first heading element type, may automatically be assumed to be a title, whereas other types of sub-elements may be assumed to correspond to a description if they have large amounts of textual contents. In an embodiment, the mapping process involves using a topology aware classifier to search for content-containing sub-elements and identify which of those sub-elements are most likely to correspond to which supplemental item metadata fields.

Template content items that conform to the target structure type are then generated, along with template sub-elements for at least any mapped sub-structure types. The template content items are similar to the target content items, except that certain contents of the target content items that do not conform to repeated sub-structural types, which may include text, attributes, and/or entire sub-elements, have been removed. For each mapped field of supplemental item descriptive metadata, a variable or other identifier that represents the field is then inserted as a dynamic value into the template sub-element(s) to which the field is mapped.

For example, each supplemental item may have metadata for a thumbnail image, title, description, link, and sponsorship information. Meanwhile, the target repeating structure may be a <div> element type with a "post" class. A document content item that conforms to this target repeating structure type may be as shown in Table 2.

TABLE 2

EXAMPLE TARGET CONTENT ITEM

```
<div class="post sports sf" id="giants1">
    <h2>Giants Sweep the Series!</h2>
    <p class ="byline"><span class="date">Oct. 31,
        2012</span><span class="source">Associated
        Press</span></p>
    <a href="giantssweep.html"><img src="123.jpg" /></a>
    <p class="content">The San Francisco Giants . . . </p>
    <p class="footer">The End</p>
</div>
```

Various mapping rules may result in identifying the following mappings between sub-structure types found in the above content item and the supplemental item metadata fields: "h2"=title (denoted below by the variable $title), "p.byline span.source"=sponsorship information ($sponsorship), "p.content"=description ($description), "a href"=link ($link), and "img"=thumbnail image ($thumb). Accordingly, a supplemental item template may be generated as depicted in Table 3.

TABLE 3

EXAMPLE TEMPLATE

```
<div class="post">
    <h2>$title</h2>
    <p class="byline"> <span class="source">
        $sponsorship</span></p>
    <a href="$link"><img src="$thumb" /></a>
    <p class="content">$description</p>
</div>
```

Note that various sub-elements from the content item are omitted from the template. This may occur because there are no repeating sub-structure types corresponding to these sub-elements and/or because no metadata field was mapped to their respective sub-structure types. However, in other embodiments, sub-elements may still be included in the template for non-mapped sub-structure types, even if left empty.

In an embodiment, certain static content may always be added to a supplemental item template, such as text that indicates that the supplemental item is "Sponsored Content." This static content may be defined globally, configured for specific sets of URLs or providers, and/or defined dynamically by a parameter in a request to insert supplemental content.

2.5. Identifying an Insertion Point

Once a target repeating structure type has been identified, an insertion point may be identified relevant to a group of content items having the target repeating structure type using any of a variety of techniques based on publisher-enforced business rules, user profiles, content analyses, and/or other factors. For example, an item number before or after which insertion should occur may be selected at random, based on instructions associated with a URL or a particular supplemental item, based on the contents or expected contents of the document itself, based on tracking data associated with a client at which the document will be presented, based on tracking data associated with a user identifier provided by the client at which the document will be presented, and so forth.

For example, a content provider may establish a rule that, for all URLs on websites hosted by the provider, supplemental items are to be inserted immediately before the fourth content item of the target group of content items. As another example, an insertion point may be selected in front of the fourth content item because the user tracking data indicates that the user is more likely to respond to supplemental items shown before the fourth content item than before other content items. As another example, an insertion point may be selected based in part on a constraint imposed by a publisher that the supplemental item should appear no higher than within a first number of pixels or sections of the document. In an embodiment, the insertion point may be specified by data that accompanies the information in block 410. For example, a request to insert a supplemental item may include a parameter that indicates the numbered position at which to insert the supplemental item.

In an embodiment, the insertion point determined in block 430 of FIG. 4 may be designated with conditional logic. For example, an insertion rule may be to first search the document for any content items that mention keywords associated with a particular supplemental item. If more than one matching content items are found, the matching content items may be ranked using any suitable relevance function, or the first such matching content item may be selected. The supplemental item is then inserted adjacent to the matching content item, either before or after the content item. If no matching content item is found, the supplemental item may be inserted before a particular enumerated content item, or not at all, depending on rules associated with the document and/or the supplemental item. In an embodiment, such logic may require that the supplemental item be selected, per block 440, prior to determining the insertion point. Moreover, particularly in embodiments where template caching is enabled and the document may change relatively quickly, a server may need to instruct a client device to implement the conditional logic. Such embodiments may further involve the client device reporting where or even if the supplemental item was shown.

In some embodiments, a publisher may identify an insertion point directly within the document, using comments in the document markup or other suitable instructions. In an embodiment, the insertion point is always designated in this manner. In another embodiment, if a predefined insertion point within a document is found, the pre-defined insertion point simply overrides an insertion point determined using the other techniques described above. In another embodiment, a pre-defined insertion point provides a fallback insertion point, in case another insertion point cannot be automatically determined, or an automatically determined insertion point cannot be found.

In an embodiment, supplemental items may be inserted by way of replacement of an existing supplemental item, in which case identifying the insertion point may comprise identifying the location of an existing supplemental item. In some cases, the location of the existing supplemental item will be known since it may have been inserted in a previous iteration of flow 400. In other cases, an existing supplemental item may be identified by, for example, searching for certain pre-defined identifiers or classifiers, or by identifying content items that conform to the repeating structure type and comprise images or other resources originating from a pre-defined group of web servers.

2.6. Achieving Native Appearance

In contrast to certain conventional supplemental item insertion techniques, which simply utilize pre-rendered supplemental items, such as images or other resources, the supplemental items in the herein-described techniques are described by metadata that is separate from any rendering. Based on this metadata, the supplemental items may thus be rendered dynamically as they are needed, therefore allowing the supplemental items to be formatted differently depending on the document in which they are inserted.

In an embodiment, as a result of the herein-described techniques, the structure and sub-structure types used in a supplemental item template are the same as or similar to those of other content items in the group of content items into which the supplemental item is inserted. Consequently, a supplemental item rendered using the supplemental item template will typically have a more "native" appearance than supplemental items inserted using certain conventional techniques. For example, the supplemental item may inherit the same style and/or layout options, defined by a Cascading Style Sheet or other suitable formatting instructions, that are used by the content items within the document. Or, the structure and sub-structure types may be chosen in such a manner as to include formatting attributes found in common amongst the content items.

In other embodiments, the techniques described herein may not necessary result in a supplemental item of substantially "native" appearance, but nonetheless may provide other advantages, such as improved flexibility or efficiencies.

3.0. STRUCTURAL OVERVIEW—NATIVE CONTENT

3.1. General System

Figure 5:
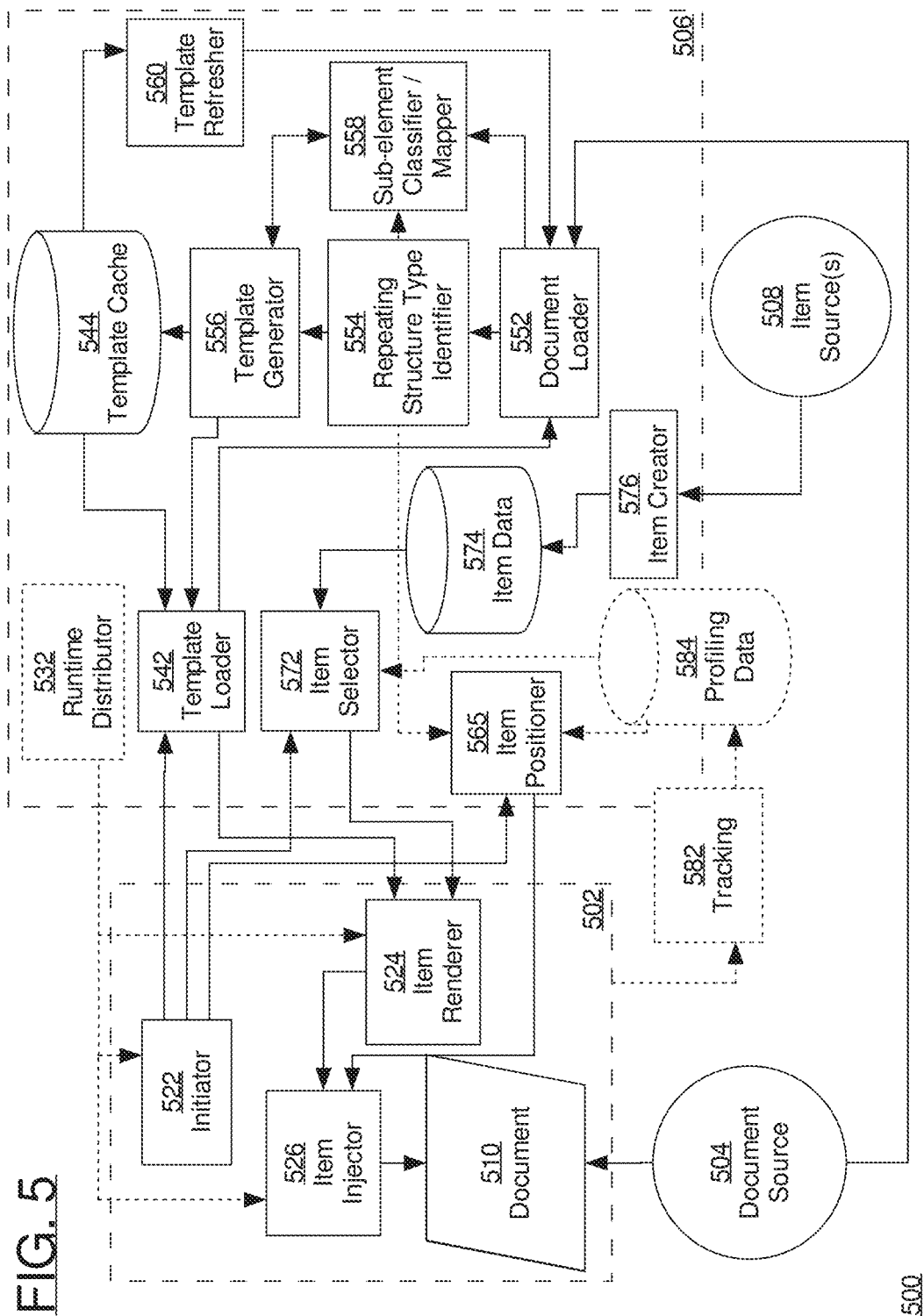
FIG. 5 illustrates an example system for inserting supplemental items in a document.

FIG. 5 illustrates an example system 500 for inserting supplemental items in a document 510, according to an embodiment. System 500 comprises components 522-584. Components 522-584 execute various logic for inserting supplemental items into document 510, and may be implemented by any suitable combination of computer software and/or hardware.

Initiating the Insertion Process

Initiating component 522 sends information about document 510 to one or more of a template loader component 542, an item selector component 572, and/or an item positioner component 565. Initiating component 522 may do so in response to a variety of events, such as in response to interpreting certain triggering instructions embedded in document 510, detecting that document 510 has been loaded for viewing, detecting that a certain amount of time has passed since last inserting or replacing a supplemental item in document 510, or receiving explicit user input requesting insertion of a supplemental item. Depending on the embodiment, the information about document 510 may include one or more of: a uniform resource identifier ("URI") or other suitable identifier/locator for document 510, metadata describing various aspects of document 510, excerpts from document 510, or the entire document 510. In an embodiment, the information includes a unique placement identifier for the document that does not change even if the contents and/or URL of document 510 change.

Additionally, initiating component 522 may also send one or more parameters that affect how a repeating structure type is identified, one or more parameters that affect how a template is chosen, one or more parameters that affect how a supplemental item is selected, information about a context in which document 510 is being viewed (e.g. at a mobile browser or at a certain type of device), and so forth. Initiating component 522 may provide different information to different components of template loader 542, item selector 572, and item positioner 565. Initiating component 522 may send information about document 510 to each of template loader 542, item selector 572, and item positioner 565 in separate communications at a same or different time. Alternatively, initiating component 522 may send a single communication that is relayed by an intermediary to each of template loader 542, item selector 572, and item positioner 565. Or, one or more of template loader 542, item selector 572, or item positioner 565 may relay document information from initiating component 522 to one or more other components of template loader 542, item selector 572, and item positioner 565.

Template Loading/Generation

Template loader 542 selects a supplemental item template based on the received information, using techniques such as described in other sections. Template loader 542 is communicatively coupled to a document loader 552, which loads document 510 for analysis. In embodiments where initiating component 522 sends document 510, or sufficient excerpts from document 510, to template loader 542, loading document 510 is a relatively trivial task. In embodiments where initiating component 522 only sends a URI or other identifier to template loader 542, document loader uses the provided identifier to locate and retrieve document 510 from a document source 504.

Once document loader 552 has loaded document 510, a repeating structure type identifier 554 identifies repeating structure types, using techniques such as described in other sections. Element classifier/mapper 558 analyzes content items that conform to the identified repeating structure type to determine how to map supplemental item metadata fields to the various sub-structure types utilized by those content items, again using techniques such as described in other sections. A template generator utilizes the outputs from repeating structure type identifier 554 and element classifier/mapper 558 to generate a supplemental item template, again using techniques such as described in other sections.

Template Caching

In an embodiment, template loader 542 is configured to immediately load the template generated by template generator 556. In other embodiments, system 500 optionally comprises a template cache 544. Template cache 544 comprises records that associate document information, such as a URI or other identifier, with a pre-existing supplemental item template, as generated by template generator 556. In some embodiments, template loader 542 may be configured to initiate template generation by components 552-558 when template cache 544 does not contain a supplemental item template for document 510. In an embodiment, when template cache 544 does not contain a supplemental item template for document 510, template loader 542 may wait to load a supplemental item template that is newly generated by template generator 556. In an embodiment, template loader 542 may decline to insert a supplemental item, or may return a default template that is not generated based on the contents of document 510, until template cache 544 contains a supplemental item template for document 510.

A template refresher 560 may update supplemental item templates in template cache 544 from time to time (e.g. every 15 minutes, every day, as resources allow, etc.). Template refresher 560 scans metadata associated with the supplemental item templates cached in template cache 544 to determine when to update supplemental item templates. Different templates may be updated at different frequencies, based on factors such as how often the templates are accessed or how often their associated documents change. Moreover, template refresher 560 may remove templates from cache 544 if the templates are accessed infrequently. Template refresher 560 is further coupled to document loader 552, in order to initiate supplemental item template generation. In an embodiment, template loader 542 may also or instead instruct components 552-558 to generate a new template in the background each time a supplemental item template is loaded from template cache 544.

In an embodiment, template cache 544 may further include information about each document for which a supplemental item template has been generated, and any time template loader 542 or template refresher 560 requests that a new template be generated, document loader 552 may compare document 510 to this information to determine whether a new template actually needs to be generated. This information may be an entire previous version of document 510, excerpts therefrom, or verification data such as described in other sections. For example, the comparison may reveal whether the underlying structures and/or sub-structures of document 510 have recently changed in such a manner as to potentially obsolete a cached supplemental item template. If so, a new template is generated. Otherwise, the template already in the cache remains valid. In an embodiment, template generation may also or instead be initiated in response to a client reporting that verification data for a document did not match the document.

Item Selection

In an embodiment, item selector 572 selects a supplemental item to insert into document 510, based on information about document 510 received from initiating component 522. For example, item selector 572 may select a supplemental item based on an analysis of content in document 510, or metadata associated with document 510. In other embodiments, however, item selection need not necessarily involve any information about document 510. Item selection may further or instead involve a variety of other information, such as the supplemental item template loaded by template loader 542 or profiling data 584 collected by a tracking component 582.

Profiling data 584 may be any suitable historical data collected, through any suitable tracking techniques, at least partially in relation to a client 502 at which document 510 is to be viewed. For example, profiling data 584 may be Hyper-text Transfer Protocol ("HTTP") session data collected in association with one or more cookies and/or unique identifiers provided by a client 502. Profiling data 584 may be specific to a certain user identifier or client device, or profiling data 584 may be generalized to a locale or a demographic to which client 502 is suspected to belong.

Supplemental items are selected from a repository of item data 574. Item data 574 may include a variety of metadata for a number of supplemental items. For each supplemental item, the metadata may include, without limitation, some or all of: a title, content, a thumbnail, a video, an image, a link address, keyword(s), a number of times the item has been inserted, a click-through rate, a target number of insertions, preferred provider(s) into whose content the supplemental item is to be inserted, preferred insertion positions, and so forth. An item creator component 576 populates item data based on input from item source(s) 508. For example, item creator 576 may include a web-based user interface or an API by which input may be provided to create new supplemental items for insertion in document 510 and/or other documents.

Additional examples of item selection techniques that make use of some or all of the above components are described in other sections of this disclosure.

Item Positioning

Item positioner 565 identifies an insertion position within document 510 for the selected supplemental item. In an embodiment, the insertion position may be selected based on information about document 510. For example, each URL (or a set of URLs) may be associated with a default numbered position within the target content items of document 510, as indicated by repeating structure type identifier 554. In an embodiment, selection need not be based on information about document 510 at all. The insertion position may also or instead be selected based on factors such as the content in document 510, profiling data 584, or the selected supplemental item itself. In an embodiment, an insertion position may be cached with the supplemental item template in template cache 544. In an embodiment, template cache 544 may include identifying information for the repeating structure type within document 510, based upon which item positioner 565 may select an insertion position. In other embodiments, a default item position is always selected.

Item positioner 565 generates insertion instructions for inserting the selected supplemental item in document 510. The insertion instructions may be as simple as a number and a repeating structure type identifier, or the instructions may include code that locates the insertion position and implements the actual insertion. The insertion instructions may vary based upon the complexity of the insertion position, the type of document 510, and the platform at which the insertion is to take place. In an embodiment, item positioner 565 is combined with template generator 556, and the insertion instructions are included with the supplemental item template.

Additional examples of techniques for selecting an insertion position that make use of some or all of the above components are described in other sections of this disclosure Item Rendering and Insertion Item renderer 524 receives template data from template loader 542. Item renderer 524 may also receive, in a same or separate communication, supplemental item description metadata from item selector 572. Item renderer 524 then renders the supplemental item by applying the metadata to the supplemental item template, as described in other sections. Item injector 526 then processes the insertion instructions from item positioner 565 to insert the rendered supplemental item into document 510, again as described in other sections.

Client-Server Architecture

As depicted, system 500 further comprises a client 502, document source 504, server 506, and supplemental item source(s) 508, at which the components 522-584 may reside. Document 510 is provided by the document source 504, which may be, for example, a file system, file server, web server, or any other suitable source of content, implemented by one or more computing devices. Document source 504 is often provided by a content publisher that is different from the operators or providers of client 502, server 506, and supplemental item source(s) 508. However, this need not always be the case.

Client 502 is a client computing device, or component thereof, that displays or causes display of document 510. Client 502 may be, for example, a web browser, a document-viewing software application, an operating system, a device that executes the foregoing, or any combination thereof. Client 502 is communicatively coupled to document source 504 via any suitable means. For example, client 502 may be connected to document source 504 by one or more networks, such as the Internet. Client 502 retrieves document 510 by sending a request to document source 504 that specifies an identifier, such as a URI, for document 510, or by sending an instruction to document source 504 that causes document source 504 to generate and return document 510.

Client 502 comprises initiating component 522, item renderer 524, and insertion component 526. In an embodiment, components 522-526 may be implemented based on a combination of functions, objects, and/or other software code that is embedded in document 510 and/or retrieved from a runtime distributor component 523 at server 506 in response to instructions embedded in document 510. For instance, some or all of components 522-526 may be implemented by JavaScript code downloaded from server 506 based on a "script" tag in document 510. In another embodiment, some or all of components 522-526 are implemented based on software instructions downloaded prior to client 502 receiving document 510. For example, components 522-526 may be hard-coded components in a document-viewing application such as a web browser or word processor, and/or components of a third-party plugin, extension, background process, or other application that interfaces with such a document-viewing application.

Server 506 comprises components 532-576. Server 506 is a system of one or more server computing devices, such as web servers, application servers, and/or database servers, that collectively implement components 532-576. In an embodiment, server 506 may be operated solely by a supplemental item distributor that is separate from document source 504 or item source 508. In other embodiments, server 506 may be implemented in full or in part by server computing devices owned and operated by a content provider that also provides document source 504.

Server system 506 may optionally comprise tracking component 582 and/or profiling data 584. However, these components may instead be provided by a different server system and/or entity than depicted in FIG. 5.

Communications between server 506 and client 502 may take place using any suitable protocols and/or data structures. For example, in an embodiment, communications to server 506 may take place using HTTP requests with POST or GET data, while communications from server 506 may involve HTTP responses having JavaScript instructions and/or JavaScript Object Notation ("JSON") or eXtensible Markup Language ("XML") data.

Variations

While various components of FIG. 5 are depicted as residing at a server 506 or a client 502, other embodiments may divide components 522-584 amongst server 506 or client 502 in different manners. For example, various embodiments may involve deploying repeating structure type identifier 554, sub-element classifier/mapper 558, item positioner 565, and/or template generator 556 at client 502. As another example, item renderer 524 may instead reside at server 506. In other embodiments, components 522-584 may reside entirely at a client 502 or entirely at a server 506. Yet other embodiments for implementing the techniques described herein may comprise fewer or different components in varying arrangements. For example, a system may omit certain components, including, without limitation, tracking component 582, profiling data 584, runtime distributor 532, or item creator 576. Moreover, the distribution of work between components 522-584 may vary from embodiment to embodiment.

3.2. System with Client-Based Insertion

Figure 6:
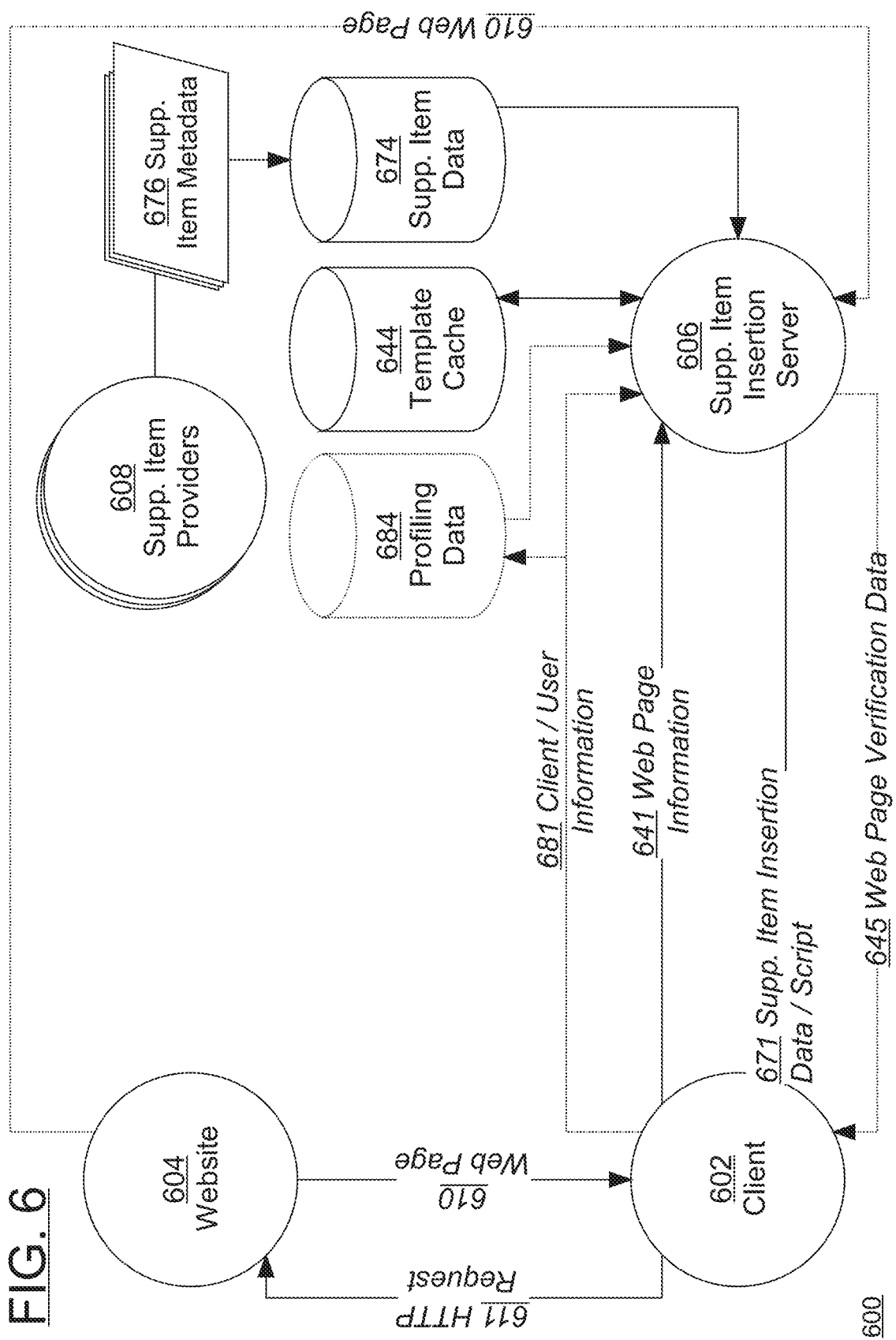
FIG. 6 is a block diagram of an example system that implements client-based insertion of supplemental items.

FIG. 6 is a block diagram of an example system 600 that implements client-based insertion of supplemental items, according to an embodiment. System 600 comprises supplemental item data 674, which is an example of a repository of supplemental items 574. Supplemental item data 674 is populated with supplemental item metadata 676 from supplemental item providers 608. A third-party supplemental item insertion server 606 is configured to utilize the supplemental item data 674 to dynamically insert supplemental items into web pages, such as web page 610 from website 604.

System 600 further comprises a client 602 that is configured to send an HTTP request 611 to a website 604. Website 604 is configured to respond with web page 610. Client 602 is an example of a client 502 from FIG. 5. Web page 610 is an example of a document 510 from FIG. 5, and may be, for example, document 100 from FIG. 1. Website 604 is an example of a document source 504 from FIG. 5.

Client 602 comprises a web browser that interprets web page 610. Web page 610 includes content. This content includes one or more groups of markup elements that conform to a common structure type, along with one or more markup elements that do not belong to any such group. Web page 610 further includes formatting information associated with these markup elements, such as inline style attributes and/or references to external CSS information. Web page 610 optionally includes instructions to request insertion of a supplemental item, such as a script tag that downloads insertion initiating instructions from supplemental item insertion server 606. In other embodiments, client 602 may be configured to initiate the supplemental item insertion process without explicit instructions in web page 610 (e.g. through a browser plug-in or hard-coded functionality at the client).

Once client 602 has received web page 610, client 602 is configured to send web page information 641, such as a URL or portions of the web page, to supplemental item insertion server 606, over the course of one or more HTTP requests. Supplemental item insertion server 606 is an example of a server 506 from FIG. 5. Supplemental item insertion server 606 is configured to utilize supplemental item data 674, along with components and processes such as described elsewhere in this disclosure, to generate supplemental item insertion data 671. In an embodiment, the supplemental item insertion data 671 comprise a supplemental item template, JSON-formatted supplemental item metadata for a supplemental item selected from supplemental item data 674, and JavaScript code for inserting the rendered supplemental item into web page 610. In another embodiment, the supplemental item insertion data 671 comprises JavaScript instructions to insert a supplemental item that has already been rendered at the supplemental item insertion server. In other embodiments, supplemental item insertion data 671 may comprise yet other combinations of data and/or instructions needed to assist client 602 in rendering and/or inserting a supplemental item in web page 610. Supplemental item insertion server 606 is configured to send the supplemental item insertion data 671 back to client 602 over the course of one or more HTTP responses.

Client 602 is further configured to utilize the supplemental item insertion data 671 to render the supplemental item as an HTML-formatted element (if necessary), such as content item 370 from FIG. 3, and insert the element into web page 610. Client 602 is then configured to display the web page 610, with the inserted supplemental item, to a viewer. In an embodiment, the rendered supplemental item uses the same data structure type(s) as used by a group of markup elements into which the rendered supplemental item was inserted, and thus the formatting instructions that were included or referenced by web page 610 apply to the rendered supplemental item as well.

Supplemental item insertion server 606 may, in some embodiments, be communicatively coupled to website 604 so that supplemental item insertion server 606 may separately load web page 610 as needed. Supplemental item insertion server 606 may also utilize a template cache 644 so that supplemental item insertion server 606 is not required to generate some or all of supplemental item insertion data 671 each time the URL of web page 610 is visited. Moreover, client 602 may further be configured to send client/user tracking information 681 to supplemental item insertion server 606. Supplemental item insertion server 606 generates profiling data 684, which is an example of profiling data 584 from FIG. 5, based on client/user information 681. Supplemental item insertion server 606 may further utilize profiling data 584 when generating supplemental item insertion data 671.

In an embodiment, some or all of the same supplemental item insertion data 671 may be utilized for multiple visits to web page 610, even if web page 610 changes, so long as the underlying data structure types within web page 610 remain the same. Because some or all of supplemental item insertion data 671 may be reused, supplemental item insertion server 606 may further be configured, in some embodiments, to send web page verification data 645 to client 602. Client 602 is configured to use the web page verification data 645 to determine whether the web page 610 has recently changed in such a manner that the supplemental item insertion data 671 cannot be used. If so, client 602 may be configured to decline to insert the supplemental item, and may further be configured to report the problem to supplemental item insertion server 606.

System 600 is but one example of a system that implements client-based insertion of supplemental items. Other systems may comprise fewer or additional components in varying arrangements.

3.3. System with Server-Based Insertion

Figure 7:
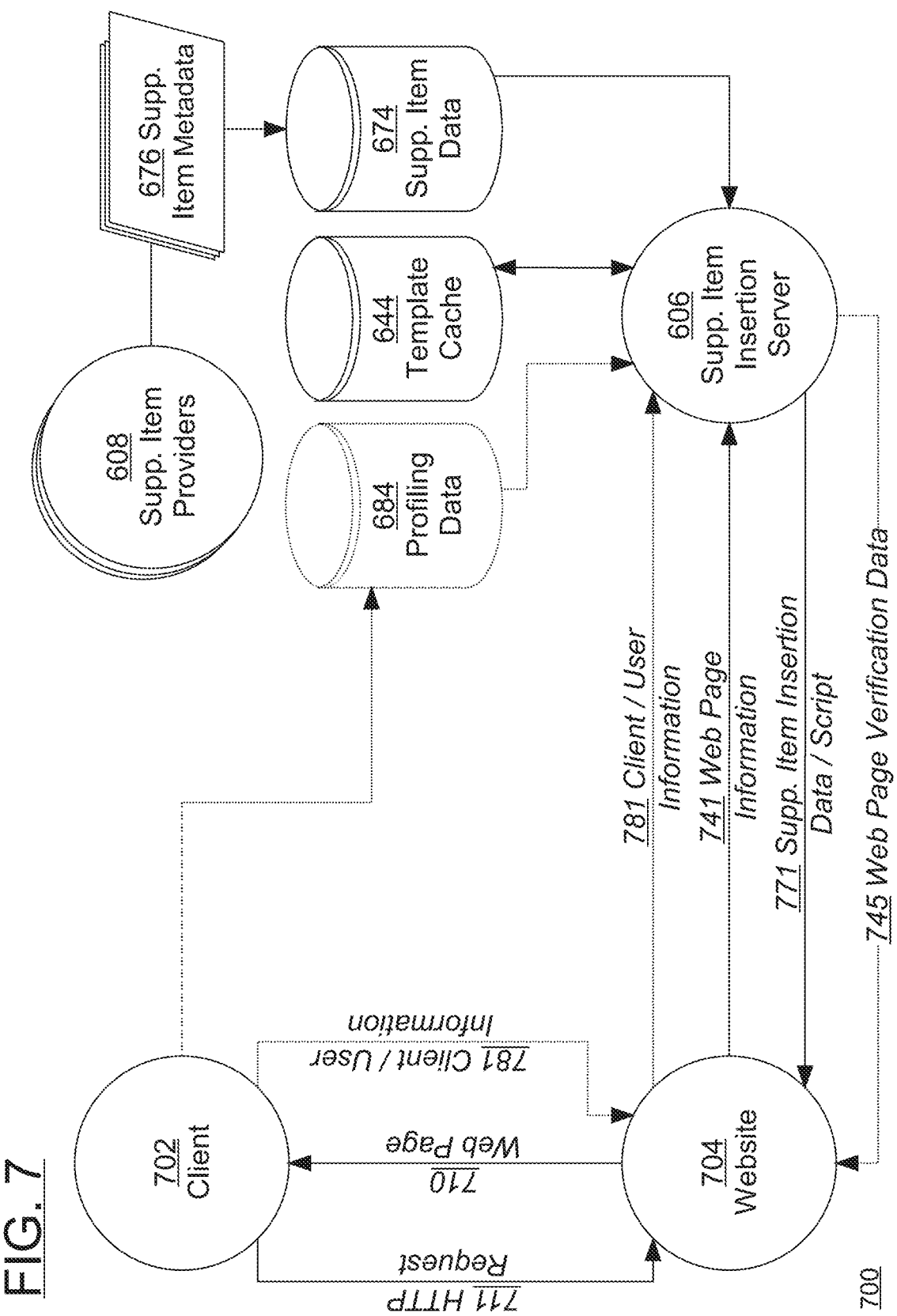
FIG. 7 is a block diagram of an example system that implements server-based insertion of supplemental items.

FIG. 7 is a block diagram of an example system 700 that implements server-based insertion of supplemental items, according to an embodiment.

Like system 700, system 600 includes supplemental item insertion server 606, supplemental item providers 608, supplemental item metadata 676, and supplemental item data 674. System 700 may likewise optionally include profiling data 684 and template cache 644. However, system 700 is configured to insert a supplemental item in a web page 710. Unlike web page 610, web page 710 need not include instructions for client 702 to initiate the insertion process. Nor does client 702, which displays web page 710, need to execute instructions for inserting the supplemental item or rendering the supplemental item.

Instead, when client 702 sends HTTP request 711 to website 704, website 704 is configured to initiate a supplemental item insertion process. For example, web page 710 may be the output of a web application, written in a language such as PHP or Java. Certain instructions within the web application may initiate the insertion process by referencing a supplemental item insertion library. As another example, website 704 may include a module that post-processes web pages before they are returned to client 702. Part of the post-processing may involve initiating the insertion process.

Website 704 is then configured to send web page information 741, which may be similar to web page information 641, to supplemental item insertion server 606. Supplemental item insertion server 606 is configured to generate supplemental item insertion data 771. In an embodiment, supplemental item insertion data 771 is similar to supplemental item insertion data 671. In another embodiment, supplemental item insertion data 771 may be a full web page 710, with a rendered supplemental item inserted therein. Website 704 is then configured to render a supplemental item (if necessary) based on supplemental item insertion data 771, and insert the rendered supplemental item in web page 710 (if necessary). Website 704 then provides the web page 710, including the inserted supplemental item, to client 702.

Client 702 and/or website 704 are optionally configured to send client/user tracking information to supplemental item insertion server 606. Moreover, supplemental item insertion server 606 may provide web page verification data 745, which is similar to web page verification data 645, to website 704.

System 700 is but one example of a system that implements server-based insertion of supplemental items. Other systems may comprise fewer or additional components in varying arrangements. Moreover, system 600 and system 700 may in fact be part of the same system, with supplemental item insertion server 606 being configured to facilitate both insertion techniques.

Note that, although separate embodiments are discussed herein, any combination of embodiments and/or partial embodiments discussed herein may be combined to form further embodiments.

4.0. IMPLEMENTATION EXAMPLES—NATIVE CONTENT

4.1. Template Verification Data

As explained in other sections, in an embodiment, the same supplemental item template and/or insertion instructions may be utilized for multiple viewings of a document, even if the document changes between viewings, so long as the underlying data structure types within the document remain the same. Since a cached supplemental item template and/or insertion instructions may be selected for use with a document without the server having ever analyzed the current state of the document, it is thus possible that the document may have changed since the supplemental item template was cached, in such a manner as to no longer be compatible with the supplemental item template and/or insertion instructions. For example, if the document had recently changed to incorporate a new layout or new inline styles, the insertion instructions may not correctly identify the repeating structure type, and thus inadvertently insert the supplemental item in an undesirable location. Or, the supplemental item template may rely on sub-structure types which are inconsistent with those of the group of content items into which the supplemental item is to be inserted, and thus be formatted in undesirable manners.

In an embodiment, prior to an item injector 526 or other like component inserting an item into a document, a document verification component compares certain verification data to the document, in its current state. The verification data may be provided, for example, in association with the supplemental item template. In an embodiment, the verification data may be cached with the supplemental item template, and returned with or even in the supplemental item template. The verification data indicates at least the target structure type, the sub-structure types that are expected of that target structure type. The verification data may further include information that indicates the types of structures and/or formatting expected at the target insertion point. The verification data may also include further information to verify, as needed. If the verification data matches the current document, a supplemental item may be inserted. Otherwise, the supplemental item can be discarded.

4.2. Example Supplemental Item Description

In an embodiment, a supplemental item insertion server provides supplemental item descriptive metadata to a client device in an interchange format such as JSON that is parseable by the client device. An example of a supplemental item in such a format is illustrated in Table 4.

TABLE 4

EXAMPLE JSON METADATA

```
{
    "title" : "Title of Supplemntal Item"
    "description" : "Description of Supplemental Item"
    "thumb" : "http://example.com/somepic.jpg"
    "link" : "http://example.com/moreinfo.html"
    "sponsorship" : "Sponsored by YOURCOMPANY"
}
```

4.3. Example Rendered Supplemental Item

The supplemental item depicted in Table 4 may be used, for example, with the template depicted in Table 3 to render the HTML-formatted supplemental item in Table 5.

TABLE 5

EXAMPLE RENDERING OF SUPPLEMENTAL ITEM

```
<div class="post">
    <h2> Title of Supplemntal Item</h2>
    <p class="byline"> <span class="source">Sponsored by
        YOURCOMPANY</span></p>
    <a href="http://example.com/moreinfo.html"><img src="
        http://example.com/somepic.jpg" /></a>
    <p class="content"> Description of Supplemental Item</p>
</div>
```

4.4. Example Javascript-Based Insertion Flow

Figure 8:
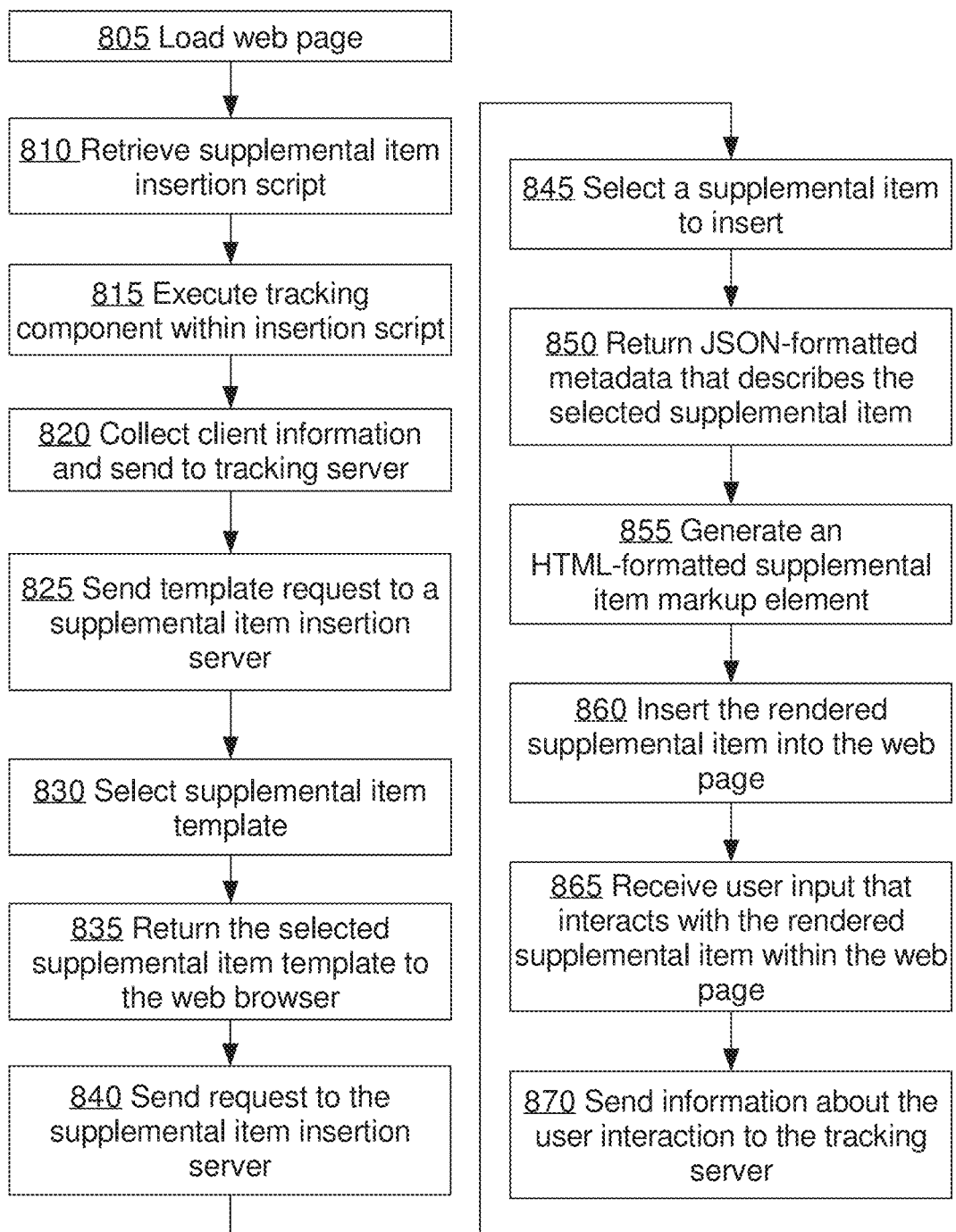
FIG. 8 illustrates an example flow for a JavaScript-based insertion of a supplemental item into a web page.

FIG. 8 illustrates an example flow 800 for a JavaScript-based insertion of a supplemental item into a web page, according to an embodiment. Flow 800 may be implemented by many of the client-based insertion systems described herein.

Block 805 comprises loading, at a web browser on a client such as client 502, a web page, which is an example of document 510. Block 810 comprises retrieving a supplemental item insertion script referenced in a "script" tag of the webpage. Block 815 comprises the web browser executing a tracking component within the insertion script. Block 820 comprises the tracking component collecting various client and/or user information and sending that information to a tracking server.

Block 825 comprises the web browser executing a template retrieval component within the insertion script to send an "Asynchronous JavaScript and XML" ("AJAX") request to a supplemental item insertion server, such as server 506. Block 830 comprises, in response to the request, a template loading component at the supplemental item insertion server, such as template loader 542, selecting a supplemental item template using techniques such as described herein. Block 835 comprises the server returning the selected supplemental item template to the web browser in any suitable template format.

Block 840 comprises the web browser executing a supplemental item requestor component within the insertion script to send a request to the supplemental item insertion server. Block 845 comprises, in response to the request, a supplemental item selector at the supplemental item insertion server, such as item selector 572, selecting a supplemental item to insert based on techniques such as described herein. Block 850 comprises the server returning JSON-formatted metadata that describes the selected supplemental item.

Block 855 comprises the web browser executing a rendering component within the insertion script to generate an HTML-formatted supplemental item markup element based on applying the JSON-formatted metadata to the template. Block 860 comprises the web browser executing an insertion component within the insertion script to insert the rendered supplemental item into the web page, using techniques such as described herein.

Block 865 comprises the web browser receiving user input that interacts with the rendered supplemental item within the web page. For example, the user input may click on a link embedded within the rendered supplemental item. Block 870 comprises, in response to the user input, the web browser once again executing the tracking component within the insertion script to send information about the user interaction to the tracking server.

4.5. Variations

In an embodiment, items may be inserted into content displayed within an application that displays repetitively structured content items, such as in mobile application for browsing a news feed or viewing social media posts. In such embodiments, and in other embodiments using other types of documents, the template may be predefined for the content, rather than generated dynamically, and the client may be responsible for identifying the target group of content items into which the supplemental item is inserted. In another embodiment, the application may be responsible for dynamically submitting the entire document to the insertion server, so that the server may generate a template. The server may then cache the template if caching is enabled.

In an embodiment, supplemental items may be inserted into documents whose target content items are arranged in such a manner that insertion of an additional item into the document would "break" the document layout and/or otherwise affect document readability or functionality. For example, a document may provide a "gallery" view in which there are three items per row. Adding an additional item might put four items on a row, or create a new row with only one item. Various techniques may be utilized for such documents. For example, a content provider may specify that, for such documents, supplemental items should be inserted by way of substitution for an existing content item. Or, a content provider may specify that an entire row of supplemental items should be inserted.

In an embodiment, publishers can provide fallback content that is inserted if a supplemental item cannot be inserted or selected.

5.0. GENERAL OVERVIEW—THIRD PARTY TRACKING

If supplemental items are distributed on both a first web domain published by a first content provider and a second web domain published by a second content provider, it may not be possible for the supplemental item provider to know whether a device that is visiting the first web domain is the same as a device that has already visited the second web domain. Consequently, the effectiveness in placing supplemental items across the multiple domains is impaired. For instance, the supplemental item provider may desire to only show a particular supplemental item only once per user device, but have no reasonable way of ensuring that the particular supplemental item is not inadvertently shown to the user device twice—once on each web domain. Similarly, if a user has requested that the supplemental item provider not show a certain type of supplemental item to the user's device on the first web domain, the supplemental item provider may not be able to honor the request at the second web domain because the supplemental item provider would not know when the user's device was visiting the second web domain. Additionally, even aside from distribution of supplemental items, there are a wide variety of other contexts in which conventional third-party tracking and/or personalization techniques are ineffective.

Approaches, techniques, and mechanisms are disclosed for third-party tracking of user data. Instructions provided in association with a first document cause a client at which the first document is viewed to load a second document in a tracking document container associated with the first document. The second document belongs to a third-party domain that is different than a first domain to which the first document belongs. Instructions provided in association with the second document cause the client to retrieve a particular identifier from a local storage area for the third-party domain at the client. The instructions provided in association with the second document further cause the client to send a message to a server comprising the particular identifier.

In an embodiment, the server is configured to select a supplemental item to insert in the first document based on the particular identifier. The client receives data describing the supplemental item from the server, and inserts the supplemental item into the first document. In an embodiment, the client further sends, with the message comprising the particular identifier, an indication of one or more events that occurred at the client while displaying the first document. The server is configured to log the one or more events in association with the particular identifier.

According to an embodiment, a third-party may utilize the techniques described herein to determine when a client that has viewed first documents from a first set of one or more domains is viewing a second document from a second domain. Responsive to making such a determination, in an embodiment, a supplemental item may be inserted into the second document based on a log of events that is associated with the client. The events were logged in association with the client's viewings of the first documents. In an embodiment, responsive to making such a determination, the third-party may also or instead log additional events for the client, the additional events occurring in association with the client's viewing of the second document.

According to an embodiment, a method comprises providing, from a server system executing on a third-party domain, to a client computing device, a tracking document. The tracking document comprises one or more instructions that, when executed by the client computing device, cause the client computing device to: load a client-specific identifier from a data store allocated for the third-party domain; and send the client-specific identifier to the server system in one or more messages indicating one or more events that have occurred in association with a first document. The first document is from a first domain that is different from the third-party domain. The method further comprises receiving, from the client computing device, the client-specific identifier in the one or more messages indicating the one or more events that have occurred with respect to the first document at the client computing device. The method further comprises, responsive to the one or more messages, storing tracking information reflecting that the one or more events occurred in association with the client-specific identifier.

In an embodiment, the first document comprises a tracking document container that instructs the client computing device to load the tracking document from the server system. In an embodiment, the method further comprises providing, to the client computing device, one or more instructions that cause the client computing device to insert the tracking document container into the first document. In an embodiment, the tracking document container is hidden within the first document.

In an embodiment, the method further comprises receiving a request from the client computing device to select an item of supplemental content for display at the client computing device, locating the client-specific identifier based on information in the request, and selecting the item of supplemental content based on the tracking information stored in association with the client-specific identifier. In an embodiment, the method further comprises sending to the client computing device one or more instructions that, when executed by the client computing device, cause the client computing device to insert the selected item of supplemental content into the first document. In an embodiment, the one or more messages include the request to select the item of supplemental content, and the tracking information indicates at least which item of supplemental content was selected.

In an embodiment, the one or more instructions, when executed by the client computing device, further cause the client computing device to provide the client-specific identifier from identifier loading instructions associated with the tracking document to event tracking instructions associated with the first document. In an embodiment, the one or more instructions, when executed by the client computing device, further cause the client computing device to listen for event tracking messages provided by event tracking instructions associated with the first document, and, responsive to the event tracking messages, send the one or more messages with the client-specific identifier to the server system. In an embodiment, the method further comprises providing the event tracking instructions.

In an embodiment, the one or more events include user input at the client computing device selecting a specified element within the first document. In an embodiment, the data store allocated for the third-party domain is inaccessible to the client computing device when executing instructions associated with documents that do not belong to the third-party domain.

In an embodiment, the one or more instructions further cause the client computing device to send the client-specific identifier to the server system in a second set of one or more messages indicating a second set of one or more events that are associated with a second document. The second document is from a second domain that is different from the first domain and the third-party domain. The method further comprises receiving, from the client computing device, the client-specific identifier in the second set of one or more messages indicating that the second set of one or more events have occurred with respect to the second document at the client computing device. The method further comprises, responsive to the second set of one or more messages, updating the tracking information to reflect that the second set of one or more events has occurred in association with the client-specific identifier.

According to an embodiment, a system comprises: content server systems comprising one or more server computing devices configured to provide content documents to client computing devices, the content server systems belonging to two or more different content provider domains; client computing devices configured to display the content documents and execute instructions associated with the content documents, the instructions including one or more instructions to load a tracking document within tracking document containers that have been inserted into the content documents; and a third-party server system belonging to a third-party domain that is different from the two or more content provider domains. The third-party server system comprises one or more server computing devices configured to: receive messages indicating specific events that have occurred with respect to specific documents, of the content documents, at specific clients of the client computing devices. The messages include client-specific identifiers loaded by the client computing devices in response to one or more instructions in the tracking document. The one or more server computing devices are further configured to store, in association with the client-specific identifiers, tracking information reflecting the specific events indicated by the messages.

In an embodiment, the tracking information includes, for a particular client of the client computing devices, a first event log entry reflecting an occurrence of a first event with respect to a first document belonging to a first content provider domain, and a second event log entry reflecting an occurrence of a second event with respect to a second document belonging to a second content provider domain. The first content provider domain is different from the second content provider domain.

In other aspects, the invention encompasses a computer apparatus and a computer-readable medium configured to carry out the foregoing steps.

6.0. STRUCTURAL OVERVIEW—THIRD PARTY TRACKING

Figure 10:
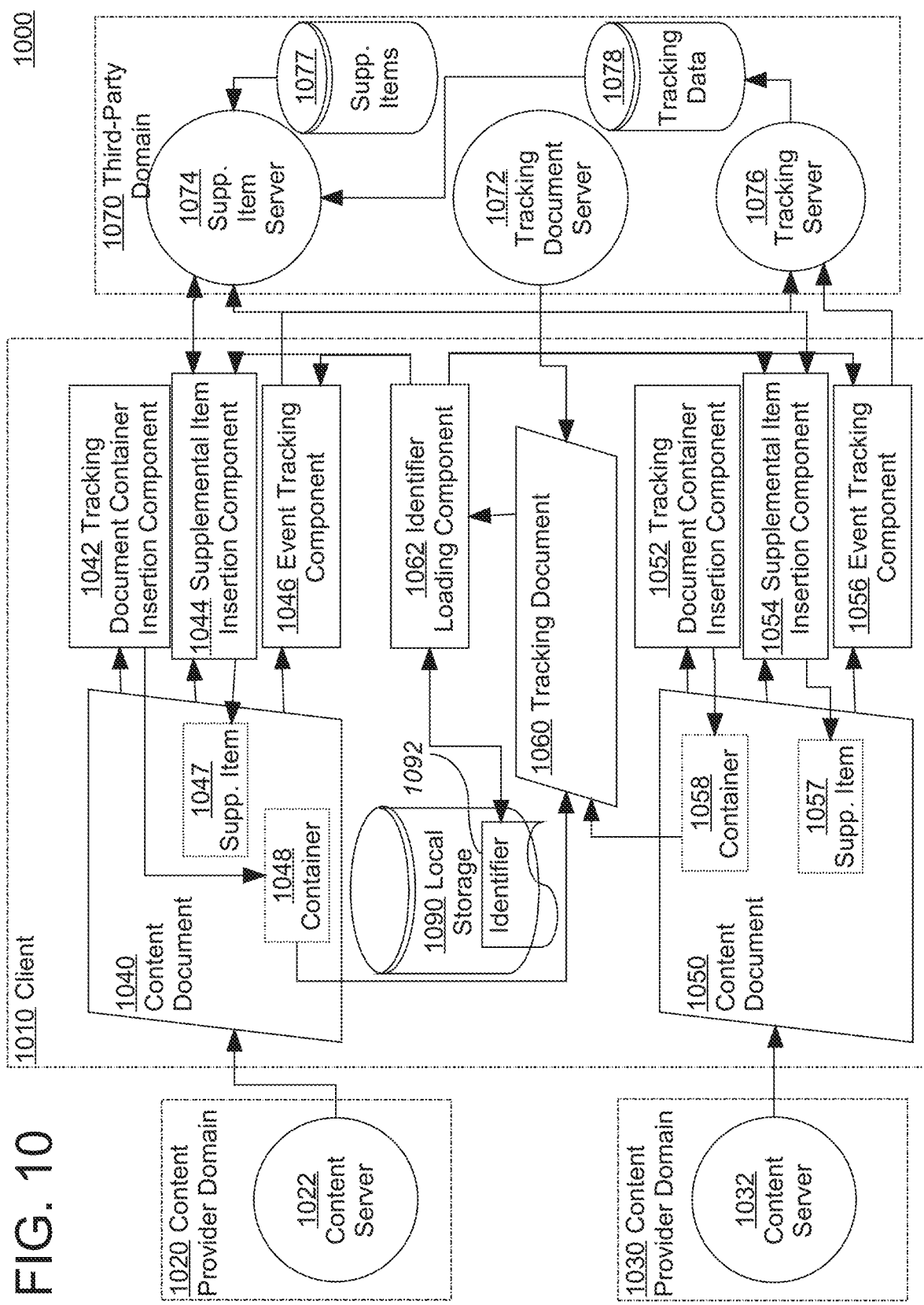
FIG. 10 illustrates an example system in which the techniques described herein may be practiced.

FIG. 10 illustrates an example system 1000 in which the techniques described herein may be practiced, according to an embodiment. System 1000 comprises at least one client 1010 that is communicatively coupled by one or more networks, such as the Internet, to content servers, such as content servers 1022 and 1032, on two or more different domains, such as content provider domains 1020 and 1030. Client 1010 downloads documents, such as documents 1040 and 1050, from these content servers. System 1000 further comprises various server components, such as server components 1072-1076, on a third-party domain 1070. The downloaded documents contain or have been modified to contain a tracking document container, such as tracking document containers 1048 and 1058, that references a tracking document 1060 from the third-party domain 1070. As described below, on account of this fact, the various server components of third-party domain 1070 are able to utilize a same identifier 1092 to consistently identify the client 1010. In this manner, the various server components of third-party domain 1070 are able to provide client-specific functionality with respect to documents downloaded to client 1010, regardless of from which of the two or more different domains the documents are downloaded.

For convenience, a system of one or more computing devices that respond to requests directed towards one or more domains is referred to herein as a "server" or "server system." In some embodiments, the server system comprises only one server computing device. In other embodiments, the server system may comprise many server computing devices. Moreover, on account of distributed components and/or high availability techniques such as load balancing and clustering, a client interacting with a server system may in fact interact with several different computing devices over the course of that interaction.

6.1. Client

Client 1010 is a client computing device, or component thereof, that displays or causes display of documents such as documents 1040 and 1050. Client 1010 may be, for example, a web browser, a document-viewing software application, an operating system, a device that executes the foregoing, or any combination thereof. In an embodiment, documents 1040 and 1050 are web pages formatted in the Hyper-Text Markup Language ("HTML"). However, the techniques described herein are applicable to other types of documents as well.

In an embodiment, client 1010 is a smartphone, tablet, or other mobile computing device. However, the techniques described herein are equally applicable to clients 1010 that are other types of computing devices, such as desktop computers. Client 1010 retrieves documents 1040 and 1050 by sending a request to content servers 1022 and 1032, respectively, that specifies a document identifier, such as a Uniform Resource Indicator ("URI"), for documents 1040/

1050, or by sending an instruction to content servers 1022 and 1032 that causes content servers 1022 and 1032 to generate and return document 1040 or 1050, respectively.

6.2. Content Provider Servers/Domains

Each of content servers 1022 and 1032 is a system of one or more server computing devices, including web servers, application servers, and/or database servers, that collectively provide various documents to clients such as client 1010. In an embodiment, each content server 1022 and 1032 may be provided by a different content publisher, each of which is in turn different from the operators or providers of client 1010 and third-party domain 1070. However, in other embodiments, this need not necessarily be true. Communications between a content server 1022/1032 and client 1010 may take place using any suitable protocols and/or data structures. For example, in an embodiment, communications to content server 1022/1032 may take place using Hypertext Transfer Protocol ("HTTP") requests with POST or GET data, while documents may be returned via HTTP response messages.

Each of content servers 1022 and 1032 is deployed in a different one of domains 1020 and 1030. In an embodiment, the term domain as used herein may refer to, for example, a web domain within the Domain Name System (DNS). Objects belong to a web domain if they reside at, or were originally retrieved from, one or more server computers that have been assigned to the web domain, or otherwise respond to requests directed to the web domain. A server system is considered to be "assigned to," "belong to," or "deployed within" the domain if an address by which a network interface at the server system receives requests for documents, such as an Internet Protocol ("IP") address, is mapped to the domain by, for instance, a root name server, authoritative name server, or other suitable domain lookup mechanism. A web domain is typically assigned a domain name, which is an identification string comprising a first identifier followed by one or more identifiers for one or more parent-level domains. Examples of domain names include "example.com" or "www.example.com.au."

Depending on the embodiment, a web domain may be a second-level, third-level, or any other suitable level domain. Each web domain may comprise many additional subdomains (lower-level domains) that belong to the web domain. For example, "www.example.com" and "www1.example.com" may be considered subdomains of the "example.com" web domain. In an embodiment, the term domain as used in describing the systems and techniques described herein always refers to a web domain that resides at a same particular level within a domain hierarchy, such as at a second-level. In another embodiment, the term domain always refers to a lowest level web domain. In yet another embodiment, the term domain always refers to a highest level web domain within an autonomous DNS zone, including all subdomains within that DNS zone.

In an embodiment, the term domain, as used herein, may refer to any other suitable type of domain, such as a security domain. For example, a domain may be an application or collection of applications that all trust a common security token for authentication, authorization, or session management.

6.3. Third Party Tracking/Supplemental Item Server

As explained above, system 1000 further comprises various components 1072-1078 within a third-party domain 1070 that is different from domains 1020 and 1030. In an embodiment, third-party domain 1070 may be operated solely by a supplemental item distributor. However, in other embodiments, the third-party domain 1070 may be operated by any entity, including a content provider that distributes content documents through domain 1020 or 1030.

For simplification, this disclosure may at times describe certain actions as being performed by or with respect to a third-party domain. These actions should be understood as being performed by one or more computing devices belonging to or acting on behalf of the third-party domain, such as a server that responds to communications addressed to the third-party domain, or a computing device operating within a network of computing devices that belong to the third-party domain.

Third-party domain 1070 includes a tracking server 1076. Tracking server 1076 receives event messages from clients, such as client 1010, indicating the occurrence(s) of one or more events relative to documents being displayed at the clients, such as documents 1040 and 1050. The event messages may report any event that a client has been configured to track, including without limitation the loading of a document, the insertion of a supplemental item, the selection of a hyperlink or other interface element within the document, and/or other user input such as mouse clicks or movements, key presses, scrolling, and so forth. The event messages may take any suitable form. In an embodiment, the event messages may be HTTP requests triggered by beacon elements, as described in other sections. However, event messages may be communicated in a variety of other formats.

Each event message may indicate event occurrence(s) by including an event type identifier. For example, the URI to which an event message is addressed may correspond to a specific event type. Or, the event message may include data, such as HTTP GET or POST data, that lists each event type that has occurred. Each event message further includes a client identifier that is specific to the client from which the message originated, such as identifier 1092. Optionally, an event message may include other data, such as a URI or other suitable identifier for the document in association with which the event(s) occurred, other information about the document, document element(s) that have been clicked or are otherwise involved in the event(s), a number of event occurrences, a timestamp, a duration of time since a corresponding document was requested or received, session identifiers, an Internet Protocol ("IP") address, other client identifiers, geo-location data, and so forth.

In response to these messages, tracking server 1076 updates a repository of tracking data 1078 to reflect the event occurrence(s). In an embodiment, tracking data 1078 may reflect each event occurrence individually, in the form of a new record within a running log of events. In an embodiment, tracking data 1078 may also or instead reflect each event occurrence by incrementing a counter record that is uniquely associated with at least the event type and the client-specific identifier. In an embodiment, the log or counter record may furthermore be associated with a document URI, a category of content, a content provider domain, and/or other information. Tracking data 1078 may also or instead contain other aggregations and/or statistics concerning the event occurrences indicated in the messages received by tracking server 1076.

In an embodiment, tracking data 1078 may further associate a client-specific identifier with characteristics, such as a geographic location, an age group, social media data, or other demographic information. These characteristics may be derived from event messages and/or explicitly specified during an account registration or configuration process associated with the client-specific identifier.

Third-party domain 1070 further includes a supplemental item server 1074. Supplemental item server 1074 selects supplemental items, such as supplemental items 1047 and 1057, from a repository of supplemental items 1077, and provides information necessary for clients such as client 1010 to display the supplemental items in association with documents such as documents 1040 and 1050. One example of a suitable supplemental item server 1074 is server 606.

Supplemental item server 1074 receives certain requests for supplemental items that include either a client-specific identifier, such as identifier 1092, or session data by which a client-specific identifier may be located. Supplemental item server 1074 may utilize this client-specific identifier to select a supplemental item that is targeted or specifically recommended for the client identified by the client-specific identifier. To this end, supplemental item server 1074 is also coupled to tracking data 1078. Supplemental item server 1074 is configured to utilize some or all of the tracking data 1078 to target supplemental items to a client 1010.

For example, each supplemental item described by supplemental item repository 1077 may include targeting metadata indicating certain categories or conditions to which a supplemental item is targeted. Tracking data 1078 may indicate that a client identified by a certain client-specific identifier has viewed at least a certain number of web pages within a certain category within the last day. In accordance to a rule associated with this fact, the supplemental item server 1074 may select a supplemental item that has been targeted to this certain category. Or, supplemental item server 1074 may utilize a relevance function to generate a client-specific relevance score for one or more supplemental items in supplemental item repository 1077. The relevance function may be based on features or variables derived from the tracking data 1078 with respect to the client-specific identifier, such as how frequently the client visits a certain type of website or how recently the client received a certain type of supplemental item. A supplemental item may then be selected, in part, based upon the client-specific relevance score.

In an embodiment, similar principles may be extended to groups of clients of which the client indicated by the client-specific identifier is a part. For example, supplemental items may be targeted to a group of clients that share the same or similar characteristics. Likewise, some or all of the features in a relevance function may be derived from tracking data 1078 that pertains to a group of clients that share the same or similar characteristics as the client identified by the client-specific identifier. In so doing, supplemental item server 1074 may deliver, for example, a certain supplemental item to one client because it has often been clicked on by users at other clients within a same group as the client.

In an embodiment, supplemental item server 1074 further provides instructions that, when executed by a client 1010, causes the client 1010 to insert supplemental items 1047 and 1057 within documents 1040 and 1050, respectively. However, some or all of the supplemental items served by supplemental item server 1074 may instead simply be displayed in association with documents displayed at client 1010, such as in a supplemental item viewing area of a document-viewing application at client 1010, or of any other application at client 1010. For instance, a number of applications intended for mobile devices include a periodically appearing supplemental item banner or "pop-up" display. Supplemental item server 1074 may be configured to select which supplemental items appear in such displays.

Third-party domain 1070 further includes a tracking document server 1072 that provides a tracking document 1060 to clients such as client 1010. Tracking document server 1072 may be the same as, or different from, supplemental item server 1074 and/or tracking server 1076. Third-party domain 1070 may further include other components that deliver instructions, such as JavaScript files, necessary to implement some or all of the client-side components described herein.

Communications between client 1010 and the various server components 1072-1076 of third-party domain 1070 may take place using any suitable protocols and/or data structures. For example, in an embodiment, communications to third-party domain 1070 may take place using HTTP requests with POST or GET data, while communications from third-party domain 1070 may involve HTTP responses having HTML instructions, JavaScript instructions, JavaScript Object Notation ("JSON") data, and/or eXtensible Markup Language ("XML") data.

6.4. Client-Side Components

In additional to displaying documents such as documents 1040 and 1050, client 1010 executes various client-side components that facilitate the third-party tracking and supplemental item insertion processes described herein. These components include a tracking document container insertion component 1042, a supplemental item insertion component 1044, an event tracking component 1046, and an identifier loading component 1062.

In an embodiment, components 1042-1046 are instances of executable processes that are implemented based on a combination of functions, objects, and/or other client-side software instructions that are embedded in document 1040 and/or retrieved from various servers in response to instructions embedded in document 1040. For instance, some or all of components 1042-1046 may be implemented by JavaScript code downloaded from tracking document server 1072 or content server 1022 in response to a "script" tag in document 1040. Client-side instructions that implement components 1042-1046 may be found in a single "<script>" tag or referenced JavaScript file, or in any number of "<script>" tags or referenced JavaScript files. JavaScript files containing suitable client-side instructions that implement components 1042-1046 may be downloaded directly from a server on third-party domain 1070, or from a location on content server 1022.

Identifier loading component 1062 is likewise an instance of executable processes that are implemented based on a combination of functions, objects, and/or other client-side software instructions. However, the client-side instructions that implement identifier loading component 1062 are found in tracking document 1060, or in one or more JavaScript files referenced by tracking document 1060 and downloaded directly from a server on the third-party domain 1070. In an embodiment, client-side instructions for implementing the supplemental item insertion component 1044 and/or the event tracking component 1046 may also be associated, in whole or in part, with tracking document 1060 as opposed to document 1040.

Generally, the client-side instructions described herein are "associated" with a particular document. The particular document with which the client-side instructions are associated is the document with respect to which, or in the context of which, the client-side instructions are executed.

The client-side instructions furthermore have read and write access via a document object model or other suitable representation of this particular document. Furthermore, the act of processing the associated document resulted in the client processing the client-side instructions. The client-side instructions may have become associated with the particular document using any suitable technique. For example, the client-side instructions may be embedded within the document or embedded within one or more files that are referenced by the document. In HTML, for instance, client-side instructions may take the form of JavaScript code found in one or more "<script>" tags within the document, or in one or more files whose URLs are referenced by a "src" attribute of a "<script>" tag. Client-side instructions may also or instead take the form of code in other suitable languages.

Tracking document container insertion component 1046 is configured to insert a tracking document container 1048 into document 1040. As used herein, the term "tracking document container" may refer to any element of a document that contains a separate document loaded dynamically from a server. In HTML, for instance, the "iFrame" element is typically used, though other elements, including a "frame" element or pop-up window, may also be utilized. Tracking document container insertion component 1046 may insert tracking document container 1048 using any suitable technique for interacting with document 1040, such executing JavaScript insertion functions that interact with a document object model ("DOM") representation of document 1040. In an embodiment, however, client 1010 may not necessarily comprise a tracking document container insertion component 1046. In such an embodiment, tracking document container 1048 may already have been embedded within document 1040 by the content provider or content server 1022.

Tracking document container 1048 comprises an instruction, such as a "src" attribute, that causes the client 1010 to load a tracking document 1060 referenced by the tracking document container 1048. The tracking document 1060 belongs to third-party domain 1070. Client 1010 may download tracking document 1060 directly from a server on third-party domain 1070, such as tracking document server 1072, or, if client 1010 has downloaded tracking document 1060 before, client 1010 may load the tracking document 1060 from a local cache. In an embodiment, tracking document container 1048 is hidden within document 1040. For example, tracking document container 1048 may be associated with formatting instructions that indicate that tracking document container 1048 is not to be displayed, or that tracking document container 1048 may be positioned outside of a viewing window for document 1040. In other embodiments, tracking document container 1048 may remain visible, but rendered in such a manner that it is nearly imperceptible. In yet other embodiments, the tracking document 1060 may display an icon or other element provided by the third-party domain 1070 or content server 1022 that is intended to remain visible in document 1040.

In an embodiment, the referenced tracking document 1060 is the same for each client. In an embodiment, the referenced tracking document 1060 is furthermore the same for each document to which the techniques described herein are applied, regardless of whether the document originates from content server 1022 and content server 1032. In other embodiments, tracking document server 1072 may provide different tracking documents 1060 for different types of clients and/or different content servers. In an embodiment, each tracking document container 1048/1058 may reference a slightly different tracking document 1060 hosted by tracking document server 1072. For example, a first tracking document 1060 may be specifically designed to handle custom event tracking functions associated with document 1040, whereas a more generic second tracking document 1060 may be designed to handle a more universal set of event tracking functions associated with document 1050.

Loading tracking document 1060 causes client 1010 to execute an identifier loading component 1062 that is associated with tracking document 1060. Identifier loading component 1062 retrieves a client identifier 1092 from a record within local storage 1090 of client 1010. Local storage 1090 may be, for example, an HTML web storage area as specified by HTML version 5, a WebSQL database, an IndexedDB database, a file or folder within a file system, one or more client-side cookie(s), or any other suitable storage area at client 1010. The identifier 1092 may be stored, for instance, in a key-value pair record associated with a key predefined by the third-party domain 1070.

Local storage 1090 may comprise, in an embodiment, two or more data substructures, such as files, directories, or tables, each of which is allocated specifically for use in association with documents from a different domain. Because identifier loading component 1062 is executed within the context of tracking document 1060 as opposed to content document 1040, identifier loading component 1062 has access to the data substructure allocated for the third-party domain 1070, whereas a component executed within the context of document 1040 might not have access to the data substructure belonging to the third-party domain 1070 on certain types of clients.

If no identifier 1092 exists, identifier loading component 1062 stores a new identifier 1092 in local storage 1090. The new identifier 1092 may be selected so as to be unique, or substantially likely to be unique, from client to client. For example, the new identifier 1092 may include or be derived from one or more identifiers of hardware or software components at client 1010. The new identifier 1092 may be generated by identifier loading component 1062, or identifier loading component 1062 may send a request to a server at the third-party domain 1070 to generate the new identifier 1092.

Event tracking component 1046 generates and sends event messages to tracking server 1076. In an embodiment, event tracking component 1046 comprises one or more subcomponents that are called when certain events occur with respect to document 1040. For example, event tracking component 1046 may, when document 1040 is first loaded, register the one or more subcomponents with event handler components of client 1010. In JavaScript, for instance, the one or more subcomponents may be functions that are registered with DOM Event objects, such as onload, onclick, or onfocus, or with timers such as setTimeout or setInterval. These event handler components are configured to call the one or more subcomponents when an event associated with the event handler occurs. The one or more subcomponents in turn send an event message to tracking server 1076 reporting that an occurrence of the event was triggered or detected. In another embodiment, event tracking component 1046 may be capable of directly monitoring for such various events.

A wide variety of events may be tracked by event tracking component 1046, including user input selecting or focusing on specific elements within document 1040, such as a supplemental item 1048. The exact events that are tracked may vary from embodiment to embodiment, or even from document to document, depending on how event tracking component 1046 is implemented. For example, the content provider that operates domain 1020 may wish to know how long a user takes to scroll through a page, while the content provider operating domain 1030 may wish to know whether a viewer ever clicks on a certain element. Accordingly, the instructions that implement event tracking component 1046 may be different than those that implement event tracking component 1056, in that the event tracking subcomponents are registered with a different set of event handlers capable of detecting different types of events.

Event tracking component 1046 may be communicatively coupled to identifier loading component 1062 via, for instance, a cross-document messaging API. In this manner, the event tracking component 1046 may receive identifier 1092 and send the identifier 1092 in event messages to tracking server 1076. For example, event tracking component 1046 may comprise a listener subcomponent that waits for a message from the identifier loading component 1062 announcing the identifier 1092. In JavaScript, for instance, the listener subcomponent may be an EventListener that receives identifier 1092 via a postMessage function call from the identifier loading component 1062.

As another example, event tracking component 1046 may comprise one or more event detection subcomponents implemented based on instructions found in or otherwise associated with document 1040 and one or more event reporting subcomponents implemented based on instructions found in or otherwise associated with tracking document 1060. When an event is detected, the one or more event detection components may send messages via the cross-document API to the one or more event reporting subcomponents. The one or more event reporting subcomponents then have direct access to the loaded identifier 1092.

Event tracking component 1046 may be configured to send the event messages using any suitable mechanism. For instance, event tracking component 1046 may create beacon elements to report the event messages, as described in other sections. However, in some embodiments, event tracking component 1046 may also or instead be capable of generating and sending the event messages directly, without the use of beacon elements.

Supplemental item insertion component 1044 is configured to request a supplemental item 1048 from supplemental item server 1074 and insert a rendered version of the supplemental item within document 1040. In an embodiment, the supplemental item is inserted in such a manner that it appears to be a native content item, as discussed herein. In other embodiments, the supplemental item 1048 is inserted in any suitable manner. In an embodiment, supplemental item insertion component 1044 may likewise be communicatively coupled with identifier loading component 1062, so as to access identifier 1092 and include it in a request for a supplemental item. In other embodiments, however, supplemental item insertion component 1044 may simply include session identifying information in a request for supplemental item. Assuming the same session identifying information was previously sent to the server in an event message within the same session, the identifier 1092 may be located in the tracking data 1078 by looking up the session identifying information.

Client 1010, as depicted, also includes a tracking document container insertion component 1052, supplemental item insertion component 1054, and event tracking component 1056. Components 1052-1056 are similar to components 1042-1046, respectively, except that they are configured for tracking and/or element insertion with respect to content document 1050 instead of 1040. It will be appreciated that each particular document for which the described techniques are enabled may have its own respective tracking document container insertion component 1042/1052, supplemental item insertion component 1044/1054, and event tracking component 1046/1056, instantiated specifically with respect to that particular document.

However, in some embodiments, some or all of components 1042-1046 may be the same as their respective counterpart components 1052-1056. For example, in an embodiment, a persistent web-browser plug-in or similar module may automatically insert tracking document containers such as tracking document containers 1047 and 1057 in some or all documents viewed by the web browser. In an embodiment, a persistent web-browser plug-in may similarly provide the supplemental item insertion component 1044/1054 or the event tracking component 1046/1056. In another embodiment, some or all of components 1042-1046 are implemented based on software instructions downloaded prior to client 1010 receiving document 1040. In an embodiment, components 1042-1046 and 1052-1056 may be hard-coded components in a document-viewing application such as a web browser or word processor, and/or components of a third-party plugin, extension, background process, or other application that interfaces with such a document-viewing application.

6.5. Miscellaneous

While only one client 1010 and two content provider domains 1020 and 1030 are depicted in FIG. 10, a system 1000 may in fact comprise any number of clients 1010 and any number of content provider domains 1020/1030. Moreover, system 1000 is one example of a system suitable for practicing certain techniques described herein. Other systems may include fewer or additional components in potentially varying arrangements. Moreover, the division of work between the depicted components may vary from embodiment to embodiment.

For example, in an embodiment, there may be multiple third-party domains 1070. For instance, tracking server 1076 and tracking data 1078 may be deployed within a third-party domain 1070 that is operated by or on behalf of a tracking service provider, whereas supplemental item server 1074 and supplemental item data 1077 may be deployed in a different third-party domain 1070 that is operated by or on behalf of a supplemental item distributor. The tracking service provider may provide the supplemental item distributor with access to some or all of tracking data 1078 for use by the supplemental item server 1074. In an embodiment, there may be multiple supplemental item distributors that have access to the same tracking data 1078, each operating their own supplemental item servers 1074 on different third-party domains 1070.

In yet another embodiment, some or all of the content providers may deploy their own supplemental item server 1074 and supplemental item repositories 1077 within domains 1020 and/or 1030, which interface with the tracking server 1076 or otherwise have access to tracking data 1078 collected with respect to third-party domain 1070. In yet other embodiments, the techniques described herein may be applied to systems 1000 that do not have a client-side supplemental item insertion component 1044, but rather make use of tracking data 1078 in various server-side processes.

For example, a content provider may deploy a client-side identifier reporting component, such as a JavaScript function, in association with a document 1040. The client-side identifier reporting component may interface with the identifier loading component 1062 to access the identifier 1092.

The client-side identifier reporting component may then send the identifier 1092 to content server 1022 via any suitable means, such as in a beacon element, or in a request for another document. Content server 1022 may then look up tracking data associated with the identifier 1092 in tracking data 1078 via an API provided by the tracking server 1076 or the tracking data 1078. Content server 1022 may then utilize this information to select content or supplemental items to provide the client 1010 in future communications to client 1010.

In yet other embodiments, the techniques described herein may be utilized for tracking purposes unrelated to supplemental item distribution. For example, a third-party tracking provider may utilize tracking data 1078 to provide reporting and/or analysis services to content providers, without deploying a supplemental item server 1074 at all.

7.0. FUNCTIONAL OVERVIEW—THIRD PARTY TRACKING

In an embodiment, each of the processes described in this section may be implemented using one or more computer programs, other software elements, and/or digital logic in any combination of general-purpose computing devices or a special-purpose computing devices, while performing data retrieval, transformation, and storage operations that involve interacting with and transforming the physical state of memory of the computing devices(s). In some embodiments, the processes are implemented in a system comprising a client computing device at which the document is viewed, such as a personal computer or mobile device, and one or more servers, such as a web server, a third-party tracking server, and/or a supplemental item server.

7.1. Personalizing Content

Figure 11:
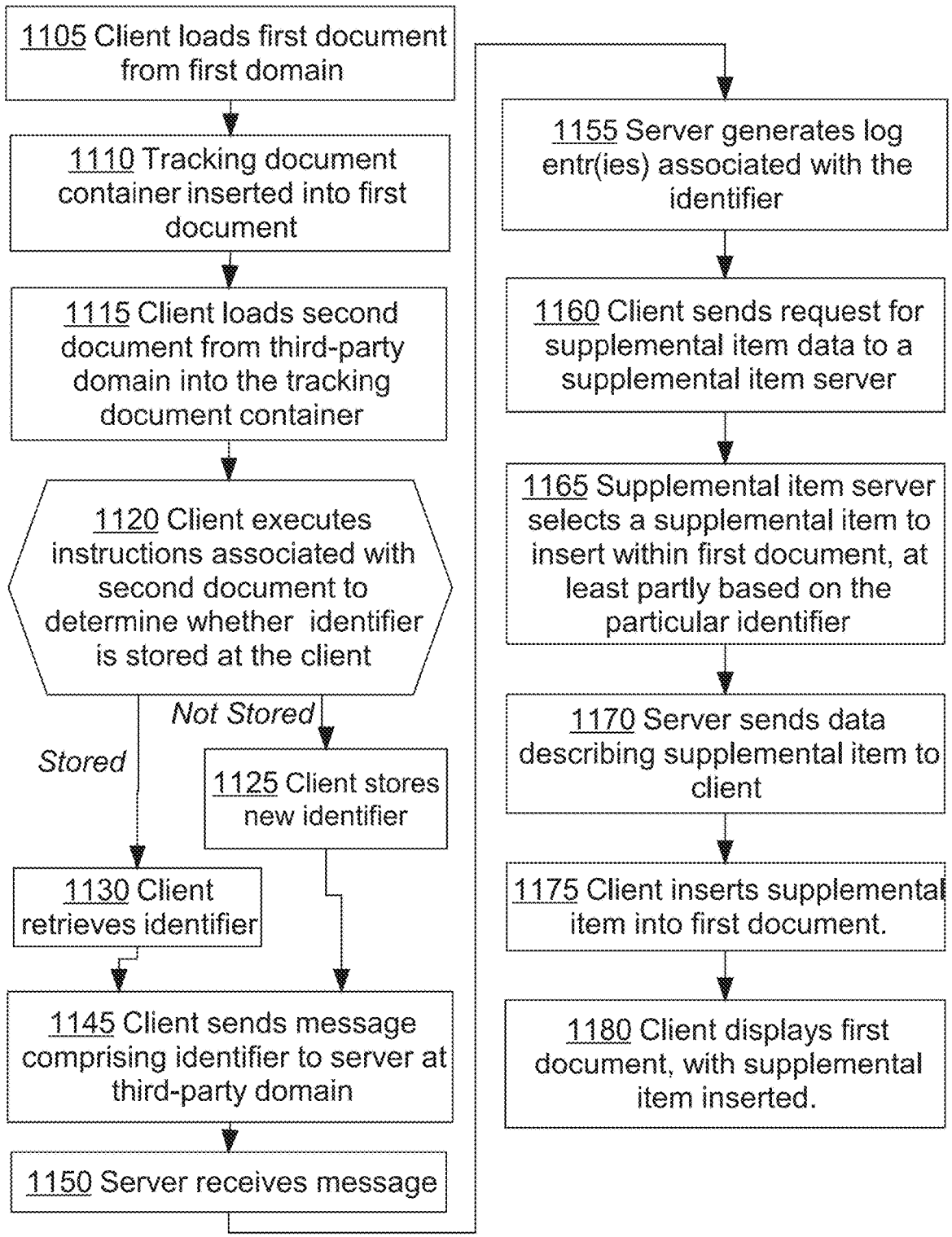
FIG. 11 illustrates an example process flow for selecting content to insert in a document using an identifier associated with a third-party domain.

FIG. 11 illustrates an example process flow 1100 for selecting content to insert in a document using an identifier associated with a third-party domain, according to an embodiment. Flow 1100 is but one example of a method for utilizing a third-party identifier. Other methods may involve additional or fewer steps in potentially different arrangements.

Block 1105 comprises loading, at a client, a first document that belongs to a particular domain. For example, a web browser may send request for a web page addressed to a web server at the particular domain. The web browser may receive, in response to the request, the web page. The web browser may then load the web page into memory. Or, the client may load the first document from a cache, file system, or any other suitable source.

Block 1110 comprises inserting a tracking document container into the first document. For example, a hidden iframe element may be inserted at the end of the first document. Any other type of tracking document container may instead be used, whether hidden or visible to the user, and may be inserted at any position relative to other elements within the first document. In an embodiment, the client may add the tracking document container in response to executing instructions found within the first document or otherwise associated with the first document. For instance, such instructions may be found within a script element within the first document, or loaded from a script file that is referenced by the first document. In an embodiment, instructions configured to cause the client to insert the tracking document container are loaded from a JavaScript file that is referenced by a script element that has been embedded or inserted into the first document. The client may retrieve the JavaScript file from the same source as the first document, or from a third-party domain, as described in other sections.

In some embodiments, regardless of from where the client retrieved the instructions configured to cause the client to insert the tracking document container, the instructions are nonetheless provided by a computing device at the third-party domain. For example, a computing device at the first domain may have downloaded the necessary JavaScript file or code block from a computing device at the third-party domain, so that a server at the first domain may provide the JavaScript file or code block in association with the first document. In other embodiments, the instructions need not be provided by a computing device at the third-party domain.

In an embodiment, the insertion occurs before the first document is ever loaded in block 1105. For example, a web developer may have included the tracking document container in the first document, or a content management system may have automatically embedded the tracking document container within the first document. As another example, a module at a web server that is serving the first document may have dynamically and automatically added the tracking document container to the first document before sending the first document to the client. In an embodiment, the tracking document container is inserted by a client-side application, such as a browser plugin or extension, other than the application in which the document is viewed.

Block 1115 comprises loading, at the client, a second document into the tracking document container. The loading may occur as a result of the client processing a reference to the second document in a source attribute or other suitable attribute of the tracking document container. Or, the loading may occur as a result of the client processing other instructions associated with the document that cause the client to interpret the tracking document container as referencing to the second document. Unlike the first document, the second document belongs to a third-party domain. For example, a web browser may request the second document from a web server whose URL is from the third-party domain instead of the first domain.

Block 1120 comprises the client executing instructions associated with the second document to determine whether a particular identifier associated with the third-party domain is stored at the client. For example, the second document may include or reference JavaScript code that, when executed by the web browser, causes the web browser to search in a local storage area at the client for one or more records associated with the third-party domain. If these one or more records do exist, and if these one or more records include a pre-defined variable, key, or field for the particular identifier, then the particular identifier is deemed found. In other embodiments, the particular identifier may be maintained at the client in other forms, and instructions associated with the second document may cause the client to locate the particular identifier using any other suitable technique.

If, in block 1120, the particular identifier is not stored at the client, then flow proceeds to block 1125. Block 1125 comprises storing a particular identifier at the client. In some embodiments, block 1125 may further comprise generating the particular identifier using any suitable technique. For example, the instructions associated with the second document may implement an identifier-generating component that generates identifiers based on a function of one or more of: client identifying information, client characteristics, time and date, random number functions, and so forth. In other embodiments, the particular identifier may instead be generated by a server at the third-party domain. The particular identifier may be requested from the server via the instructions associated with the second document, or the server may have pro-actively generated and embedded a suitable particular identifier in the second document or the associated instructions. Flow then proceeds to block 1145.

If, in block 1120, the particular identifier is stored at the client, then flow proceeds to block 1130. Block 1130 comprises retrieving the particular identifier. For example, if the particular identifier is associated with a predefined key in the local storage area of the client, then the value of that predefined key is retrieved as the particular identifier. Flow then proceeds to block 1145.

Block 1145 comprises the client sending a message comprising the particular identifier to a server at the third-party domain, such as a tracking server and/or a supplemental item server. In some embodiments, the client may send the particular identifier by generating and inserting a beacon element, as described in other sections, within the first document or second document. In other embodiments, the client may send the particular identifier in a request for a supplemental item, a supplemental item template, or supplemental item metadata. In yet other embodiments, the client may send the particular identifier using any other suitable communication mechanism.

Depending on the embodiment, block 1145 may be performed as a result of executing instructions associated with either or both of the first document and the second document. For example, JavaScript code referenced by the second document may, upon retrieving or generating the particular identifier, generate an image beacon within the first document or the second document. The JavaScript code may instruct the client to build the image beacon in such a manner so as to include the particular identifier in the query string of the URL referenced by the image beacon. As another example, upon retrieving or generating the particular identifier, JavaScript code associated with the second document may instruct the web browser to execute certain JavaScript code associated with the first document. For instance, the JavaScript code associated with the second document may make one or more calls to functions within the first document via a PostMessage API. One of these calls may include the particular identifier as a parameter. The JavaScript code within the first document then sends the particular identifier to the server.

Block 1150 comprises the server receiving the message comprising the particular identifier. Again, the particular identifier may be received using any suitable communication technique, such as in a query string of an HTTP GET request, in a cookie, or in HTTP POST data.

Block 1155 comprises the server generating one or more log entries associated with the particular identifier. The one or more log entries may reflect the occurrence of any of a variety events indicated by data received in association with the particular identifier. For example, the message received in block 1150 may include, in addition to the particular identifier, data that indicates a document identifier and/or a characteristic of the first document. A log entry may thus be generated indicating that the client associated with the particular identifier has visited a document having the document identifier and/or the characteristic indicated by the message.

Log entries may also be generated that reflect the occurrence of specific activities or user input in association with the first document, such as loading a supplemental item into the first document or receiving user input that clicks or otherwise selects an item within the first document. Indicators of such occurrences may also or instead be embedded within the message of block 1150. Techniques that more specifically address the tracking of such occurrences are described in other sections of the disclosure.

Block 1160 comprises the client sending a request for supplemental item data to a supplemental item server. The request may be simply for supplemental item metadata, for the metadata and a template, for the rendered supplemental item, or for any other data describing the supplemental item. Examples of such a request are described in previous sections. In an embodiment, the request of block 1160 is the message sent by the client in block 1145. In another embodiment, the request of block 1160 is different than the message of block 1145, but includes session data by which the supplemental item server may locate the particular identifier received in block 1150.

The supplemental item server may be the same as the server in blocks 1145-1155, or a different server. While the supplemental item server may also belong to the third-party domain, in other embodiments the supplemental item server may in fact belong to the first domain. In either event, if the supplemental item server is different from the server in blocks 1145-1155, then the supplemental item server may be configured to communicate with the server to locate the particular identifier using session data associated with the request. The supplemental item server may similarly be configured to request logs associated with the particular identifier, aggregated log data or statistics calculated from events logged in association with the particular identifier, and/or other information derived from events logged in association with the particular identifier.

In an embodiment, the client sends the request of block 1160 in response to executing instructions associated with the first document. For example, the first document may include JavaScript code that causes the client to request an insertion script and/or other data from the supplemental item server. In an embodiment, the client instead sends the request of block 1160 in response to executing instructions associated with the second document.

Block 1165 comprises the supplemental item server selecting a supplemental item to insert within the first document, at least partially based on the particular identifier. The selection may utilize the particular identifier for any of a variety of purposes. For example, a supplemental item may be selected based on it not having been selected for the particular identifier before, or based on the supplemental item having been pre-selected for the particular identifier.

The supplemental item server may also or instead utilize the particular identifier to locate other data, associated with the client, upon which to base the selection of the supplemental item. For example, the supplemental item server may locate data derived from tracking data collected by a tracking server in association with the particular identifier using techniques such as those described herein. Such data may include, without limitation, click-through logs indicating whether supplemental items previously inserted into documents viewed at the client have been "clicked" or otherwise selected by a user at the client, logs indicating documents (as opposed to supplemental items) that have previously been viewed at the client, demographic classifications of the client based on the logs, implicit preferences derived from the logs, and so forth. As another example, the supplemental item server may use the particular identifier to lookup preference data explicitly specified by the client in a registration operation, configuration operation, opt-in interaction, opt-out interaction, or other interaction between the client and the third-party domain. For example, a user may have previously provided demographic information or categorical preferences to the tracking server or the supplemental item server via a suitable web interface.

In an embodiment, using at least the data associated with the particular identifier, the supplemental item server may apply one or more business rules and/or ranking functions to select which supplemental item to provide the client. Any suitable rules or ranking functions may be applied, including functions learned through Bayesian Networks, hidden markov models, neural networks, and so forth. Other considerations for selecting supplemental items may also be utilized, including those described no other sections. Additionally, the business rules or ranking functions may utilize data associated with other clients that are determined to be similar to the client based on demographic classifications, preference data, and/or the tracking data.

Optionally, block 1165 may further comprise logging the selected supplemental item in association with the particular identifier, so as to keep a history of supplemental items selected for the particular identifier.

Block 1170 comprises the supplemental item server sending data describing the supplemental item to the client. The data may include, for example, a rendering of the supplemental item in the format of the first document, or metadata describing the supplemental item. The data may optionally include other information, such as template data and/or insertion instructions, depending on the embodiment.

Block 1175 comprises the client inserting the supplemental item into the first document. Although any insertion technique may be utilized, examples of a client inserting a supplemental item within a document are found in "Dynamic Native Supplemental item Insertion." The client may perform the insertion by executing insertion instructions associated with the first document and/or received with the supplemental item data. For example, if the request of block 1160 was made in response to executing JavaScript code associated with the first document, the client may insert the supplemental item by providing the supplemental item data to one or more JavaScript-based insertion functions associated with the first document. As another example, if the request of block 1160 was instead made in response to executing JavaScript code associated with the second document, then the client may provide the supplemental item data as input for one or more JavaScript-based insertion functions associated with the second document, which then interact with certain JavaScript functions associated with the first document to insert the supplemental item into the first document.

Block 1180 comprises the client displaying the first document, with the inserted supplemental item.

7.2. Event Tracking

Figure 12:
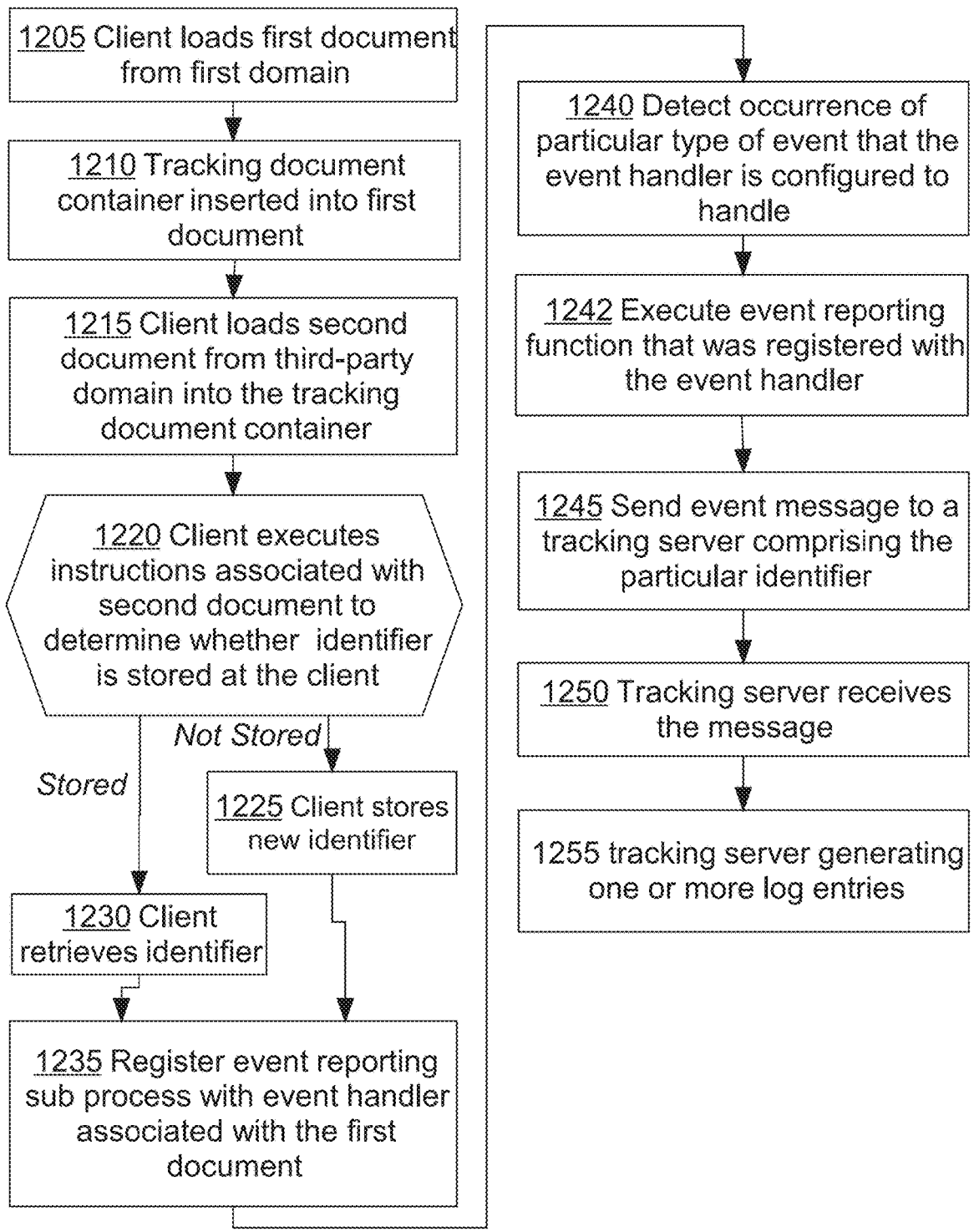
FIG. 12 illustrates an example process flow for tracking events associated with a document based on an identifier associated with a third-party domain.

FIG. 12 illustrates an example process flow 1200 for tracking events associated with a document based on an identifier associated with a third-party domain, according to an embodiment. Flow 1200 is another example of a method for utilizing a third-party identifier. Yet other methods may involve additional or fewer steps in potentially different arrangements.

Blocks 1205-1230 are the same as blocks 1105-1130, respectively.

Block 1235 comprises registering an event reporting sub process with an event handler associated with the first document. For example, the first document may be associated with client-side instructions that include an event reporting function for a particular type of event, such as the loading of the first document or a click on a certain element within the first document. The client may provide an event handler object, such as a JavaScript onload or onclick event, that is processed when the particular type of event occurs. A registration instruction that is processed when the first document is loaded may register a "callback" to the event reporting function with this event handler object. In an embodiment, the registration instruction and/or the event reporting function may be included in a same JavaScript file, referenced by the first document, that caused the insertion of the tracking document container. In another embodiment, the registration instruction and/or the event reporting function is included in a separate JavaScript file.

Block 1240 comprises detecting an occurrence of a particular type of event that the event handler is configured to handle. For example, the client may receive user input that triggers the occurrence of the particular type of event, such as clicking on a particular element within the document or moving a mouse cursor over the particular element. Or an interval of time associated with a timer may lapse, thus triggering the particular type of event. Any sort of event detection and handling mechanism may be utilized in performance of block 1240. Block 1242 comprises executing the event reporting function that was registered with the event handler. On account of the registration process of block 1235, the event reporting function is called in the course of processing the event handler in block 1240. The client then proceeds to execute the event reporting function.

Block 1245 comprises, as a consequence of executing the event reporting function, sending an event message to a tracking server comprising the particular identifier from block 1220 or block 1225. The event message may include any of a variety of information about the event, such as an event type, a timestamp, a name of an element from the first document that is involved in the event, and so forth. The event message may be sent using any suitable communication mechanism, such as by generating a beacon element in the first document or the second document. The tracking server may or may not be on the third-party domain, depending on the embodiment.

In an embodiment, block 1245 more specifically comprises the event reporting function sending a cross-document message, such as sent by a JavaScript postMessage call, to an event listener function associated with the second document. The event listener function associated with the second document then accesses the particular identifier, generates the event message, and sends the event message to the tracking server.

In another embodiment, block 1245 more specifically comprises executing instructions associated with the first document to receive the particular identifier in a cross-document message from a process implemented by instructions within the second document. The instructions then instruct the client to store the particular identifier in a data structure that is directly accessible to the first document. This may occur at any time relative to the event occurrence, including before the event has ever occurred. Then, when the event reporting function is executed, the event reporting function accesses the particular identifier, generates the event message, and sends the event message to the tracking server.

Block 1250 comprises the tracking server receiving the message, in similar manner to block 1150 of FIG. 11. Block 1255 comprises the tracking server generating one or more log entries, in similar manner to block 1155 of FIG. 11.

Some or all of blocks 1235-1255 may be repeated for any number of event types for which tracking is desired. For example, the client-side instructions associated with the first document may comprise any number of event reporting functions registered with any number of event handlers for the first document. In some embodiments, each event is reported separately, while in other embodiments, some or all of the events may be reported together in a single event message.

7.3. Extensions

In an embodiment, flows 1100 and 1200 may be performed concurrently with respect to the same first document. Thus, for instance, events associated with a supplemental item that has been inserted into the first document may be recorded and utilized for future selections of supplemental items.

In an embodiment, blocks 1105-1180 and/or blocks 1205-1255 are repeated with respect to other documents into which tracking document containers referencing the second document are inserted. These documents may include documents belonging to one or more second domains that are different from both the first domain and the third-party domain. Hence, the same particular identifier from the third-party domain may be used to select supplemental items to insert into both documents belonging to the first domain and documents belonging to other domains apart from the first domain. Similarly, the same particular identifier from the third-party domain may be used to track events associated with both documents belonging to the first domain and documents belonging to other domains apart from the first domain.

For example, a server at the third-party domain may host a single JavaScript file (or other suitable file of instructions) that is referenced by multiple documents from multiple domains. This single file, when executed by a client that downloads these documents, causes the client to insert the same tracking document container, per block 1110, in each of the these documents, thus triggering an iteration of flow 1100 with respect to each of these documents. If, in a first iteration, the particular identifier is created per block 1125, then in future iterations block 1130 will retrieve this same particular identifier, even if the future iterations involve documents from domains other than the first domain involved in first iteration.

8.0. IMPLEMENTATION EXAMPLES—THIRD PARTY TRACKING

8.1. Beacon Elements

A "beacon element," which may also be known as a "tracking pixel," is an element in a document whose primary purpose is to cause a client that is processing the element to send information to a server rather than to display information to a viewer of the document. A beacon element causes the client to send information to the server by referencing a URI located on the server. In HTML, for instance, elements such as img elements, iframe elements, style elements, script elements, input link elements, embed elements, object elements, and other elements may be utilized as beacon elements, since they generally include a "src" attribute, "href" attribute, or other attribute that references a URI from which the client is intended to request content for the elements.

In order to render the beacon element, the client will send a request to the server for any content that may be associated with the referenced URI. Typically, the URI will have been selected in such a manner that the client's request to the server will include information of use to the server. For example, the path and/or query string portion of the URI may include information of interest to the server. Additionally, or instead, an HTTP request for the content may inherently include information of interest to the server, such as a cookie, user-agent string, or POST data. In an embodiment, the URI may not necessarily correspond to content at all, but rather be designed solely to communicate information to the server.

In an embodiment, in response to a request triggered by a beacon element, the server may be configured to not respond to the client at all, or the server may be configured to return a "No Content" response. In other embodiments, the server may return a nominal response, such as a very small or empty file. The returned content may be such that it is substantially imperceptible within the document and/or the returned content may be formatted in such a manner that it is hidden from view. In yet other embodiments, the returned content may actually be visible. For example, a beacon element may also serve the purpose of retrieving content that should be displayed within the page.

Many of the beacon elements referred to herein are furthermore inserted into a document dynamically by client-side instructions. For instance, JavaScript features a number of mechanisms that permit insertion of HTML elements into a document, such as by manipulation of a document's innerHTML attribute, or by calling an appendChild function. A beacon element may be inserted into a document at any time relative to the loading of a document. Client-side instructions associated with the document may generate beacon elements designed to report event messages to a server, and then insert those beacon elements if and when the actual events occur. Since the client will process the beacon elements at the time of the insertion, the client-side instruction may thus cause the client to report event messages even after a document has been loaded.

While beacon elements are one way of sending a message to a server, it will also be appreciated that the techniques described herein may instead rely on any other suitable mechanism for sending a message to a server.

8.2. Example Javascript Implementation

Figure 13:
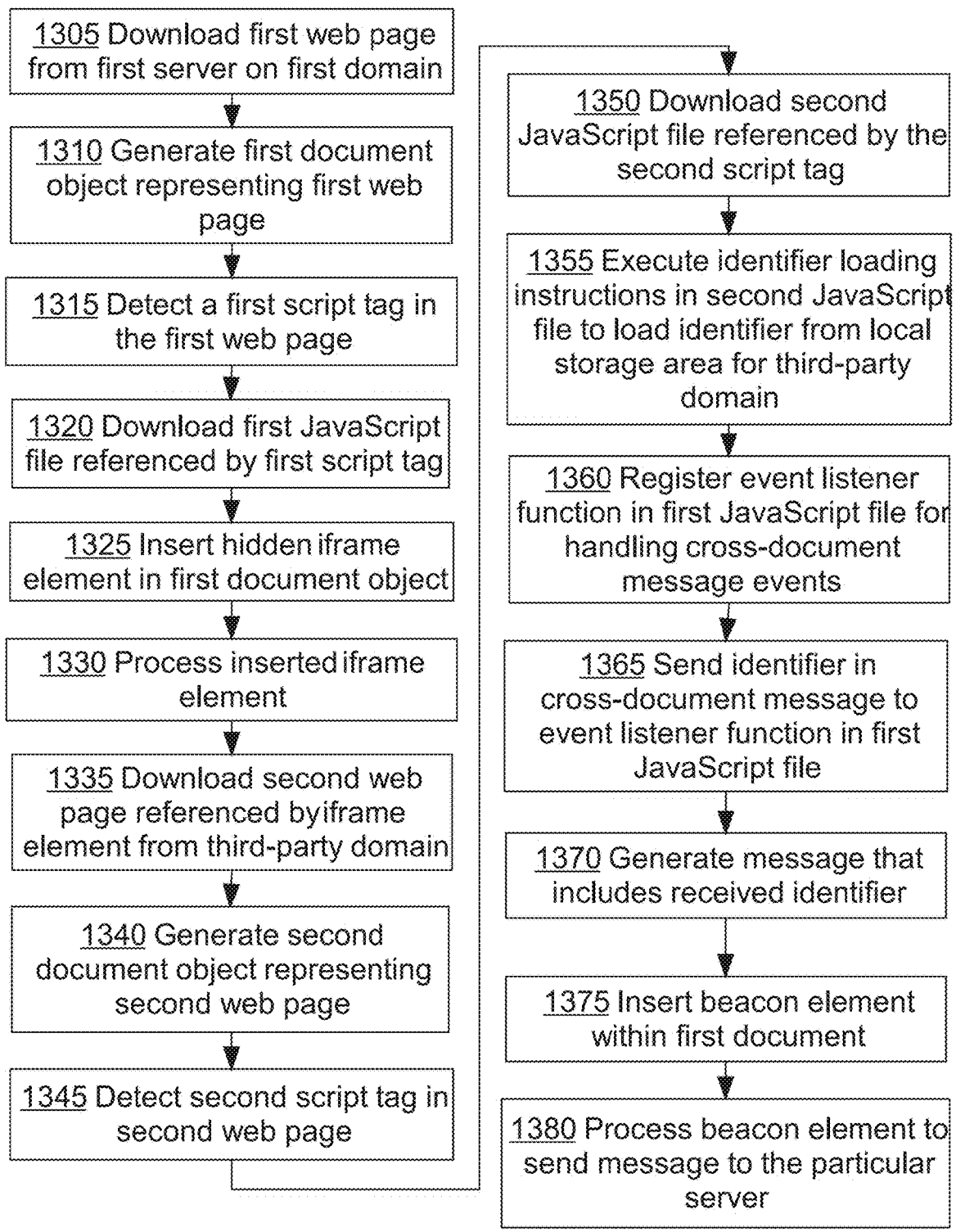
FIG. 13 illustrates an example flow for a JavaScript-specific implementation of the techniques described herein.

FIG. 13 illustrates an example flow 1300 for a JavaScript-specific implementation of the techniques described herein, according to an embodiment. Flow 1300 is but one example of a JavaScript implementation. Other flows may include fewer or additional elements, in potentially varying arrangements.

Block 1305 comprises a browser downloading a first web page from a first server on a first domain. Block 1310 comprises the browser rendering the first web page at least partially by generating a first document object representing the first web page. The first document object is a self-contained DOM tree. Block 1315 comprises the browser detecting a first script tag in the first web page. Block 1320 comprises the browser downloading a first JavaScript file that is referenced by the first script tag. Depending on the embodiment, the first JavaScript file may be downloaded from the first domain or from a third-party domain.

Block 1325 comprises the browser executing iframe insertion instructions in the first script to insert a hidden iframe element in the first document object. Block 1330 comprises the browser processing the inserted iframe element. Block 1335 comprises the browser downloading a second web page referenced by the iframe element from a third-party web server on a third-party domain. Block 1340 comprises the browser rendering the second web page in part by generating a second document object representing the second web page.

Block 1345 comprises the browser detecting a second script tag in the second web page. Block 1350 comprises the browser downloading a second JavaScript file referenced by the second script tag. Block 1355 comprises executing identifier loading instructions in the second JavaScript file to load a particular identifier from a HTML local storage area for the third-party domain.

Block 1360 comprises executing first registration instructions in the first JavaScript file to register an event listener function in the first JavaScript file for handling cross-document "message" events. Block 1365 comprises executing identifier sharing instructions in the second JavaScript file to send the identifier in a cross-document message to the event listener function within the first JavaScript file.

Block 1370 comprises executing message generation instructions within the first JavaScript file to generate a message that includes the identifier received in block 1365. Block 1375 comprises executing a beacon element insertion instruction to insert a beacon element within the first document. Block 1380 comprises the browser sending the message to the particular server in an HTTP request responsive to processing the inserted beacon element. The message may be an event reporting message, as described in other sections. Or, the message may be a supplemental item request, as described in other sections. The particular server may be a tracking server, supplemental item server, or a combination thereof.

Figure 14:
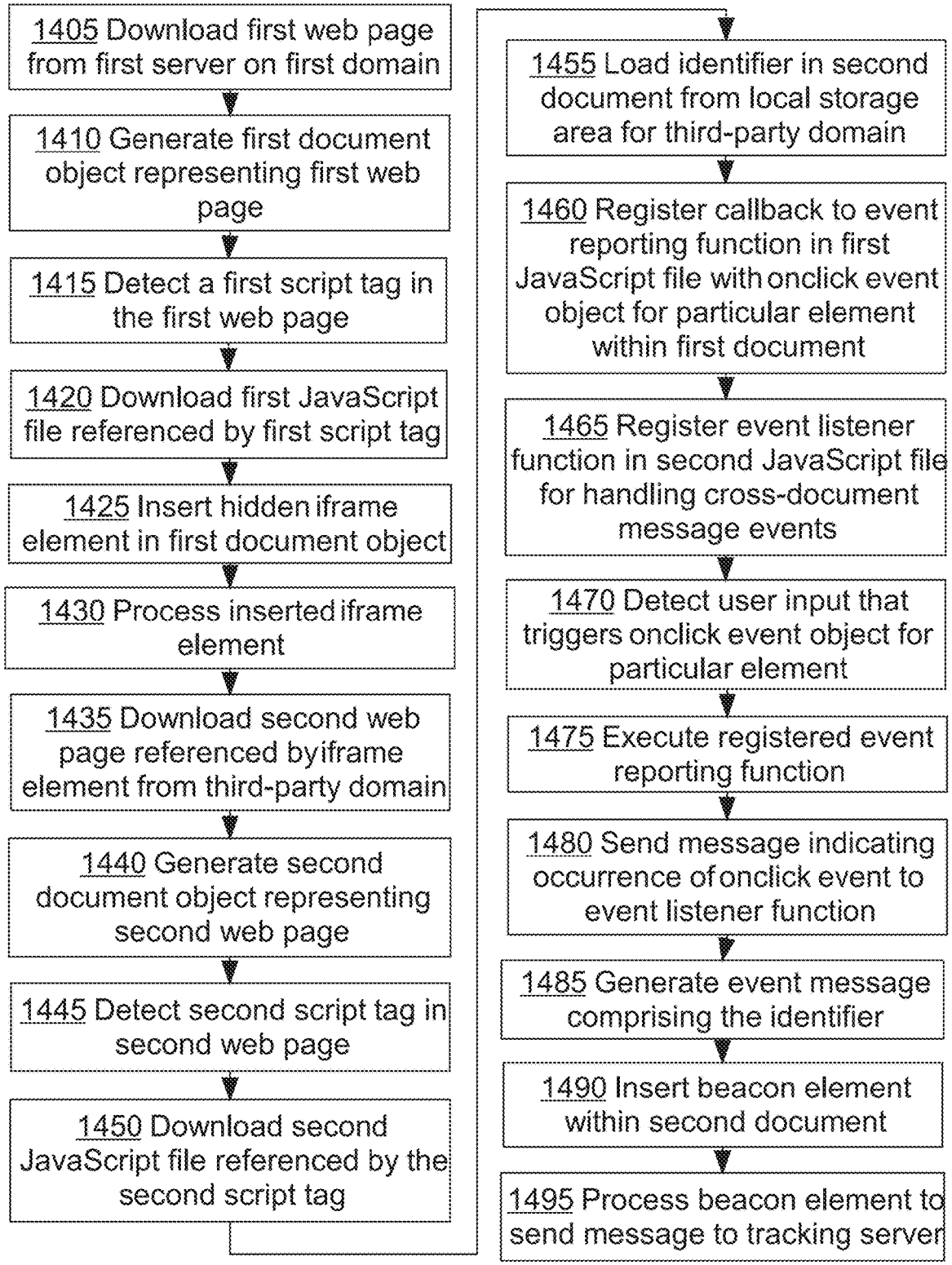
FIG. 14 illustrates another example flow for a JavaScript-specific implementation of the techniques described herein.

FIG. 14 illustrates an example flow 1400 for a JavaScript-specific implementation of the techniques described herein, according to an embodiment. Flow 1400 is but one example of a JavaScript implementation. Other flows may include fewer or additional elements, in potentially varying arrangements.

Blocks 1405-1455 are the same as blocks 1305-1355. Block 1460 comprises executing first registration instructions in the first JavaScript file to register a callback to an event reporting function in the first JavaScript file with an "onclick" event object for a particular element within the first document. Block 1465 comprises executing second registration instructions in the second JavaScript file to register an event listener function in the second JavaScript file for handling cross-document "message" events.

Block 1470 comprises the browser detecting user input that triggers the "onclick" event object for the particular element. Block 1475 comprises, responsive to the detecting, executing the event reporting function registered with the "onclick" event object. Block 1480 comprises executing a postMessage instruction within the event reporting function of the first JavaScript file to send a cross-document message indicating the occurrence of the "onclick" event to the event listener function in the second JavaScript file.

Block 1485 comprises, responsive to the cross-document message, executing message generation instructions in the event listener function to generate an event message, comprising the identifier, to send to a tracking server. Block 1490 comprises executing a beacon element insertion instruction to insert a beacon element within the second document. Block 1495 comprises the browser sending the message in an HTTP request to the particular server responsive to processing the inserted beacon element.

Other embodiments of the foregoing example JavaScript-based techniques may divide up the various JavaScript instructions amongst more than two JavaScript files. Moreover, other events instead of or in addition to the "onclick" event may be handled by the event reporting function. Multiple beacon elements may be generated for different types of events. Moreover, the JavaScript files may further include supplemental item insertion functions. A number of other variations are also possible.

9.0. IMPLEMENTATION MECHANISM—HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field pro-grammable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
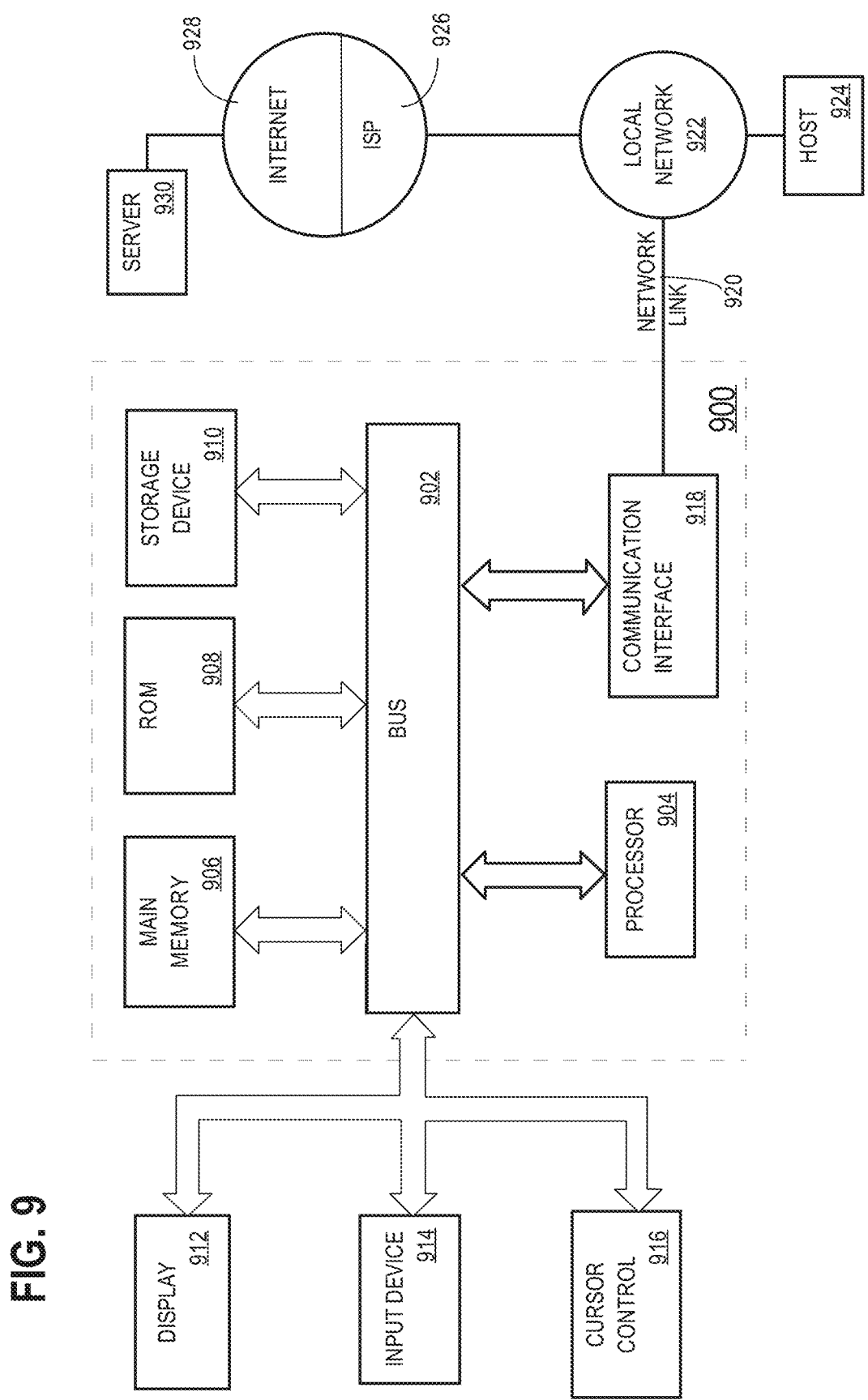
FIG. 9 is block diagram of a computer system upon which embodiments of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hardwired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 910. Volatile media includes dynamic memory, such as main memory 906. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

10.0. EXTENSIONS AND ALTERNATIVES

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computing system comprising one or more computing devices, the one or more computing devices having one or more processors configured to implement:
   a distribution component, configured to distribute item insertion initiating instructions to clients at which web pages will be displayed, the item insertion initiating instructions configured to cause the clients to send requests to a server to insert supplemental items into the web pages;
   a repeating structure type identification component configured to identify repeated structure types, within the web pages, each of the repeated structure types comprising one or more Hyper Text Markup Language ("HTML") elements that are repeated within a corresponding one of the web pages in accordance with a pattern;
   a template generation component configured to generate supplemental item templates based on the repeated structure types identified within the web pages;
   an item selector component, configured to select, from the supplemental items, particular supplemental items to insert in the web pages based on the requests;
   one or more supplemental item renderers configured to generate rendered supplemental items based on inserting particular descriptive metadata from the particular supplemental items selected by the item selector component into particular supplemental item templates;
one or more item insertion components configured to insert the rendered supplemental items into the web pages between content items that conform to the respectively identified repeated structure types.

2. The system of claim 1, further comprising:
a template cache configured to store, in one or more memories, the supplemental item templates;
a template loader component, at the server, configured to select the particular supplemental item templates from the template cache based on document identifying information associated with the requests.

3. The system of claim 1, wherein the item insertion initiating instructions are JavaScript instructions found in or referenced by the web pages.

4. The system of claim 1, wherein the one or more item insertion components are configured to insert the rendered supplemental items into the web pages by sending insertion JavaScript instructions to the clients, the insertion JavaScript instructions, when executed by the clients, causing the clients to locate particular points within the web pages and insert the rendered supplemental items at the particular points.

5. The system of claim 1, wherein the one or more supplemental item renderers are configured to generate the rendered supplemental items by sending rendering JavaScript instructions to the clients, the clients configured to execute the rendering JavaScript instructions, the rendering JavaScript instructions, when executed by the clients, causing the clients to insert the particular descriptive metadata into the particular supplemental item templates.

6. The system of claim 1, wherein the repeating structure type identification component is configured to identify the repeated structure types based on using a machine learning algorithm to select target repeated structure types from multiple candidate repeated structure types within the web pages.

7. A method comprising:
distributing item insertion initiating instructions to clients at which web pages will be displayed, the item insertion initiating instructions configured to cause the clients to send requests to a server to insert supplemental items into the web pages;
identifying repeated structure types within the web pages, each of the repeated structure types comprising one or more Hyper Text Markup Language ("HTML") elements that are repeated within a corresponding one of the web pages in accordance with a pattern;
generating supplemental item templates based on the repeated structure types identified within the web pages;
selecting, from the supplemental items, particular supplemental items to insert in the web pages based on the requests;
generating rendered supplemental items based on inserting particular descriptive metadata from the particular supplemental items into particular supplemental item templates;
inserting the rendered supplemental items into the web pages between content items that conform to the respectively identified repeated structure types.

8. The method of claim 7, further comprising:
storing, in a template cache comprising one or more memories, the supplemental item templates;
selecting the particular supplemental item templates from the template cache based on document identifying information associated with the requests.

9. The method of claim 7, wherein the item insertion initiating instructions are JavaScript instructions found in or referenced by the web pages.

10. The method of claim 7, wherein inserting the rendered supplemental items into the web pages comprises sending insertion JavaScript instructions to the clients, the insertion JavaScript instructions, when executed by the clients, causing the clients to locate particular points within the web pages and insert the rendered supplemental items at the particular points.

11. The method of claim 7, wherein generating the rendered supplemental items comprises sending rendering JavaScript instructions to the clients, the clients configured to execute the rendering JavaScript instructions, the rendering JavaScript instructions, when executed by the clients, causing the clients to insert the particular descriptive metadata into the particular supplemental item templates.

12. The method of claim 7, wherein identifying the repeated structure types is based on using a machine learning algorithm to select target repeated structure types from multiple candidate repeated structure types within the web pages.

13. One or more non-transitory computer-readable media storing instructions that, when executed by one or more computing devices, cause:
distributing item insertion initiating instructions to clients at which web pages will be displayed, the item insertion initiating instructions configured to cause the clients to send requests to a server to insert supplemental items into the web pages;
identifying repeated structure types within the web pages, each of the repeated structure types comprising one or more Hyper Text Markup Language ("HTML") elements that are repeated within a corresponding one of the web pages in accordance with a pattern;
generating supplemental item templates based on the repeated structure types identified within the web pages;
selecting, from the supplemental items, particular supplemental items to insert in the web pages based on the requests;
generating rendered supplemental items based on inserting particular descriptive metadata from the particular supplemental items into particular supplemental item templates;
inserting the rendered supplemental items into the web pages between content items that conform to the respectively identified repeated structure types.

14. The one or more non-transitory computer-readable media of claim 13, wherein the instructions, when executed by the one or more computing devices, cause:
storing, in a template cache comprising one or more memories, the supplemental item templates;
selecting the particular supplemental item templates from the template cache based on document identifying information associated with the requests.

15. The one or more non-transitory computer-readable media of claim 13, wherein the item insertion initiating instructions are JavaScript instructions found in or referenced by the web pages.

16. The one or more non-transitory computer-readable media of claim 13, wherein inserting the rendered supplemental items into the web pages comprises sending insertion JavaScript instructions to the clients, the insertion JavaScript instructions, when executed by the clients, causing the clients to locate particular points within the web pages and insert the rendered supplemental items at the particular points.

17. The one or more non-transitory computer-readable media of claim 13, wherein generating the rendered supplemental items comprises sending rendering JavaScript instructions to the clients, the clients configured to execute the rendering JavaScript instructions, the rendering JavaScript instructions, when executed by the clients, causing the clients to insert the particular descriptive metadata into the particular supplemental item templates.

18. The one or more non-transitory computer-readable media of claim 13, wherein identifying the repeated structure types is based on using a machine learning algorithm to select target repeated structure types from multiple candidate repeated structure types within the web pages.

19. The one or more non-transitory computer-readable media of claim 13,
wherein the server is a server hosted on a third-party domain, different from domains from which the web pages are served;
wherein the item insertion initiating instructions include instructions to insert tracking document containers within the web pages;
wherein the tracking document containers are configured to load a tracking document from the server or another server on the third-party domain;
wherein the requests include third-party-domain-specific identifiers loaded via the tracking document.

20. The one or more non-transitory computer-readable media of claim 13, further comprising selecting the particular supplemental items or insertion points for the rendered supplemental items based on one or more of: client identification information associated with the requests or user identification information associated with the requests, the client identification information or user identification information received in given requests from a given client being the same across web pages from different domains.

21. The system of claim 1,
wherein the server is a server hosted on a third-party domain, different from domains from which the web pages are served;
wherein the item insertion initiating instructions include instructions to insert tracking document containers within the web pages;
wherein the tracking document containers are configured to load a tracking document from the server or another server on the third-party domain;
wherein the requests include third-party-domain-specific client identifiers loaded via the tracking document.

22. The system of claim 1, wherein the item selector component is configured to select the particular supplemental items, or the one or more item insertion components are configured to select the insertion points for the rendered supplemental items, based on one or more of: client identification information associated with the requests, or user identification information associated with the requests, the client identification information or user identification information received in given requests from a given client being the same across web pages from different domains.

23. The method of claim 7,
wherein the server is a server hosted on a third-party domain, different from domains from which the web pages are served;
wherein the item insertion initiating instructions include instructions to insert tracking document containers within the web pages;
wherein the tracking document containers are configured to load a tracking document from the server or another server on the third-party domain;
wherein the requests include third-party-domain-specific client identifiers loaded via the tracking document.

* * * * *